United States Patent [19]
Smith et al.

[11] Patent Number: 5,548,698
[45] Date of Patent: Aug. 20, 1996

[54] RULE BASED PARAMETRIC DESIGN APPARATUS AND METHOD

[75] Inventors: Randall W. Smith, Naperville, Ill.; Jason Bright, St. Paul; Thomas Varghese, Minneapolis, both of Minn.

[73] Assignee: Andersen Corporation, Bayport, Minn.

[21] Appl. No.: 194,922

[22] Filed: Feb. 14, 1994

[51] Int. Cl.⁶ .................................................. G06F 15/20
[52] U.S. Cl. ........................................................... 395/139
[58] Field of Search .................................... 395/155, 161, 395/160, 139, 133; 345/127, 128, 129

[56] References Cited

U.S. PATENT DOCUMENTS

| | | | |
|---|---|---|---|
| 3,391,392 | 7/1968 | Doyle | 340/172.5 |
| 3,693,168 | 9/1972 | Halkyard et al. | 340/172.5 |
| 4,058,849 | 11/1977 | Fitzgerald et al. | 364/520 |
| 4,149,246 | 4/1979 | Goldman | 364/200 |
| 4,654,805 | 3/1987 | Shoup, II | 364/520 |
| 4,656,603 | 4/1987 | Dunn | 364/900 |
| 4,845,651 | 7/1989 | Aizawa et al. | 364/522 |
| 4,873,643 | 10/1989 | Powell et al. | 364/468 |
| 4,885,694 | 12/1989 | Pray et al. | 364/464.01 |
| 4,916,624 | 4/1990 | Collins et al. | 364/470 |
| 4,918,611 | 4/1990 | Shyu et al. | 364/474.08 |
| 4,928,252 | 5/1990 | Gabbe et al. | 364/519 |
| 4,939,666 | 7/1990 | Hardman | 364/496 |
| 4,949,280 | 8/1990 | Littlefield | 364/518 |
| 4,970,658 | 11/1990 | Durbin et al. | 364/513 |
| 4,970,664 | 11/1990 | Kaiser et al. | 395/160 |
| 4,972,318 | 11/1990 | Brown et al. | 364/403 |
| 5,091,869 | 2/1992 | Ingram et al. | 364/560 |
| 5,099,740 | 3/1992 | Minamitaka | 84/651 |
| 5,117,366 | 5/1992 | Stong | 364/474.02 |
| 5,121,334 | 6/1992 | Riley et al. | 364/474.05 |
| 5,140,530 | 8/1992 | Guha et al. | 395/13 |
| 5,150,304 | 9/1992 | Berchem et al. | 364/474.24 |

OTHER PUBLICATIONS

"Automatic generation of 2–axis laser–cutter NC machine program and path planning form CAD", Steven D. Jackson et al., *Computers in Industry*, vol. 21, No. 2, Feb. 1993, pp. 223–231.

"The future of waterjet cutting", Terry D. Alkire, *Manufacturing Technology International*, 1 Jan. 1990, pp. 201–204.

"Automatisierte Attribut–Programmierung fur die Laser–Blechfertigung", T. T. Pham et al., *ZWF Zeitschrift Fur Wirtschaftliche Fertigung Und Automatisierung*, vol. 86, No. 3, 1 Mar. 1991, pp. 117–121.

"3D–Schachtelungssystem fur die Pertigung kleiner Frasteile aus Plattenmaterial", *VDI Zeitschrift*, Von Engelbert Westkamper et al., vol. 135, No. 5, 1 May 1993, pp. 32, 35–37.

*Primary Examiner*—Phu K. Nguyen
*Attorney, Agent, or Firm*—Merchant, Gould, Smith, Edell Welter & Schmidt

[57] ABSTRACT

A rule based parametric design apparatus and method utilize one or more predetermined designs including draw primitives and/or other objects. Designs for the draw primitives are preferably created by artists who refine and distill the designs into a set of rules, with the rules residing in a computer program. This allows the original, or "parent" design, to be automatically adapted to differently shaped and sized windows and window groupings, while the shapes of the grouping change as units are added to the overall design, the unity of the overall art work is maintained. A computer, with associated memory to store the various data tables, implements the algorithms and program constraints associated with the present invention.

22 Claims, 18 Drawing Sheets

X=0

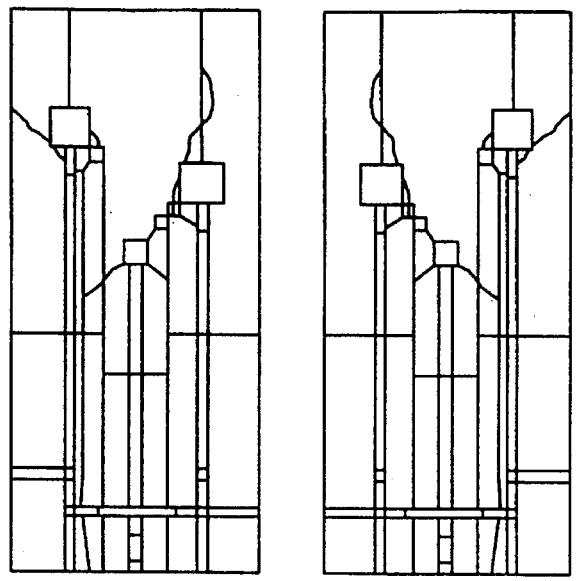
FIG. 4D
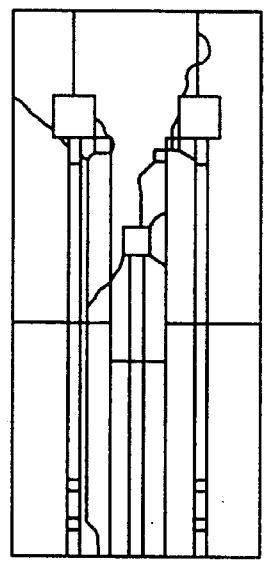
FIG. 4E
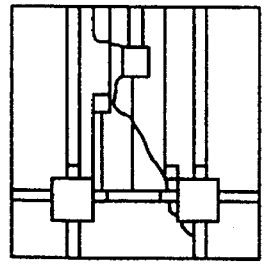

RULE BASED PARAMETRIC DESIGN APPARATUS AND METHOD

FIELD OF THE INVENTION

The present invention generally relates to resizing designs, more particularly relates to resizing a predetermined design comprised of draw primitives and other objects in accordance with rule based parameters, and still more particularly relates to resizing original art glass designs while maintaining the aesthetics of the design as determined by the designer with rule based parameters.

BACKGROUND OF THE INVENTION

The design and construction of art glass, commonly referred to as stained glass, is typically characterized as a very time and labor intensive endeavor. In most if not all instances the design and the glass itself must be specifically hand generated for each window, panel or other partition. Therefore, to date art glass works have been extremely limited in terms of applications and readily available sizes. Additionally, since such an extraordinary amount of manual creation and/or customization is required, the installation of art glass is expensive. Thus, a method and apparatus to design art glass for variously sized applications from a known parent pattern, while retaining both manufacturability and aesthetics of the original parent pattern, is desirable.

Almost all available CAD (computer aided design) packages today are capable of scaling drawings, along all axes or along just specified ones at the same or differing ratios. However, as those skilled in the art will appreciate, not all parts of the drawing will scale uniformly. For example, a circle may need to maintain its aspect ratio so that it is not transformed into an ellipse. Further, not limiting the example to art glass windows, a certain shape may need to maintain its size regardless of everything around it. An example of the latter may be a jewel in the case of an art glass window or certain sized threaded members (such as screws) in non-art glass applications. In either type of application, it will be appreciated that the issue generally arises for items which are available in predetermined sizes.

Thus, resizing CAD objects can be a difficult and tedious operation. When resizing with present CAD programs, a human operator must constantly review the operation and enter information to insure that the various required constraints are followed. Additionally, a human operator is required to review the implications of the constraints. By way of example, a line that touches a circle may have to be extended or shortened, and as noted above, there may also be other needed constraints due to availability of certain parts in certain fixed sizes.

Many plans, drawings, and detailed specifications are now done using CAD-type programs such as AUTOCAD or Vellum. These programs utilize and generate information on the objects in the drawings in a predetermined manner. Typically the information on the spatial location of the objects is provided in terms of [X, Y, Z] Cartesian coordinates. The information also generally includes size, location, etc. of the various geometric draw primitives.

To create a CAD drawing, an operator enters the designs manually into the CAD program. When creating a resized version of the design, the operator must recalculate and/or re-enter various properties for each variation from the original or parent design. By doing so, however, errors in the drawings may be magnified and cause problems during actual implementation of the design. Accordingly, due to these drawbacks, a design cannot be simply scaled.

More specifically, the use of present CAD systems in order to offer a wide variety of art glass designs for insertion into a wide variety of rough openings requires that either a large number of predetermined CAD drawings are stored in computer memory or that an operator recreate each design for each rough opening. In the first case, this system is useful only for predetermined rough opening sizes and, therefore, does not allow for custom sized openings. Additionally, it wastes computer space and requires that an operator initially resize each drawing with the drawbacks noted above. In the second case, the operator must resize each drawing with the drawbacks noted above. In both cases, the original artist of the parent design may not be able to constrain the design aesthetically unless the artist is part of the process of resizing each design.

Therefore, there is a need in the art for an automatic resizing apparatus and method for designs comprised of draw primitives (and/or other objects) in accordance with rule based parameters. Further, there is a need for a method and apparatus which resizes original "fixed size" art glass designs while maintaining the aesthetics of the design by utilizing rule based parameters.

SUMMARY OF THE INVENTION

The present invention provides for a rule based parametric design apparatus and method. The apparatus utilizes one or more predetermined designs including draw primitives and/ or other objects. Designs for the draw primitives are preferably created by artists who refine and distill the designs into a set of rules, with the rules residing in a computer program. This allows the original, or "parent" design, to be automatically adapted to differently shaped and sized windows and window groupings. As used herein, this will be referred to as "rule based design."

In general, a first designed art glass window is a parent design. If a second window is added to the grouping, the rule based design preferably insures that the two panels relate to each other. Typically, this may involve design elements of the original grouping moving to the added panel. One of the features of the present invention is that while the shapes of the grouping change as units are added to the overall design, the unity of the overall art work is maintained. For example, this may be accomplished by insuring that whenever bevels reach the edge of a panel, they continue in the adjacent panel. Additionally, if a transition is required, it is preferably made within the panel rather than at the panel boundary. Still further, horizontal and vertical lines preferably match from panel to panel. The designs are not merely repeated utilizing rule based design, but are instead rebalanced to create a total aesthetic composition. The result is that rule based design of the present invention offers grouping flexibility for consumers of the art glass and integrity of design for the artist.

For applications which resize parent designs for insertion into a different sized opening, the original artist can impose constraints on individual draw primitives and/or objects (e.g., such as a jewel or a beveled glass pane). By doing so, certain designed areas can be maintained in a predetermined aesthetic arrangement when resizing occurs. Further, at various sizes, additional design elements may be added to the design in order to maintain the aesthetics of the design. Still further, objects such as jewels and beveled panes (which are available in limited sizes) can be exchanged for a differing size at predetermined intervals in the resizing continuum. These points at which the additions and/or exchanges occur will be referred to as "spring points" herein.

Accordingly, the present invention provides for an improved redesign process, which creates new designs from parent designs given the constraints and limitations of the parent design and the components/objects found within the design. The program utilizes several algorithms, constraints, and program features to fully automate the creation of new designs—thereby eliminating the need for an operator for scaling, determining size of objects, etc.

In a preferred embodiment of an apparatus constructed according to the principles of this invention, the apparatus includes a microprocessor and associated memory to store the various data tables, and to implement the algorithms and program constraints associated with the present invention.

Therefore, one feature of the present invention is the utilization of predetermined rules to ensure the artistic integrity of the predetermined designs. This allows for unique creations of designs using a parent design for both multi-panel layouts and individual panel layouts which are resized to fit into the desired rough opening.

Another feature of the present invention is the capability to preview the resized design. This is done by creating the resized design and then generate an output pict file which may be graphically displayed on a computer monitor. This allows an operator and/or purchaser to preview the resized art glass window.

Therefore, according to one aspect of the invention, there is provided a process for automatically resizing a design, the design being of the type created by a CAD system, comprising the steps of: (a) entering a design, the design including a plurality of draw primitives having predetermined relationships to one another; (b) entering a set of rules related to resizing the design; and (c) resizing the design automatically in accordance with the rules, wherein the design is reconfigured to a different two-dimensional size without operator intervention.

According to another aspect of the invention, there is provided a method of resizing an art glass design for frames of differing sizes from a predetermined art glass design, the design of the type which may include arcs, circles, lines, and complex objects each having known geometrical relationships to one another, the method comprising the steps of: a) selecting a desired art glass design; b) selecting a desired frame size; and c) determining the placement of the complex objects, arcs, circles and lines within said selected frame size automatically in accordance with a rule based software program operating in a hierarchical fashion, whereby placement of the arcs, circles, lines, and complex objects occurs in accordance with predetermined rules to maintain manufacturability and aesthetics.

According to yet another aspect of the invention, there is provided an apparatus for automatically generating resized art glass designs from an original art glass design, the apparatus comprising: (a) memory means for storing an art glass design in a computer memory location, the design including one or more draw primitives and wherein associated with the draw primitives is data representative of the spatial relationship between the draw primitives in the design; (b) first processor means for applying a set of predetermined rules to the draw primitives in said memory means, wherein the draw primitives are ranked relative to one another; and (c) second processor means for visiting the ranked draw primitives and for resizing the ranked draw primitives to create a resized design, wherein operator intervention is not required.

These and other advantages and features which characterize the present invention are pointed out with particularity in the claims annexed hereto and forming a further part hereof. However, for a better understanding of the invention, its advantages and objects obtained by its use, reference should be made the Drawing which forms a further part hereof, and to the accompanying descriptive matter, in which there is illustrated and described a preferred embodiment of the present invention.

BRIEF DESCRIPTION OF THE DRAWING

In the Drawing, wherein like reference numerals and letters indicate corresponding elements throughout the several views:

FIGS. 4a–4e illustrate the creation of additional windows and resized windows from a parent art glass design;

DETAILED DESCRIPTION OF THE PREFERRED EMBODIMENT

The principles of this invention apply to the resizing and rule based creation of predetermined designs. A preferred application for this invention is in the creation and resizing of art glass designs from parent designs. It will be appreciated by those skilled in the art that such application is typical of only one of the innumerable types of applications in which the principles of the present invention can be employed.

Therefore, it will be appreciated by those skilled in the art that while the example of art glass is utilized herein, the principles of the present invention apply to the resizing of a parent design in a CAD environment—in accordance with predetermined rules (e.g., constraints) so as to maintain certain characteristics of the parent. In the case of artistic works the aesthetic quality of the parent design may also be maintained. It will also be appreciated that while resizing is the main example used herein, the present invention also includes the ability to create a family of related windows as will be described below.

In order to better understand the present invention, the description of the computer programming logic utilized to resize the various parent designs will be deferred pending a brief discussion of several universal considerations or constraints useful in art glass design, a discussion of the computer system utilized, and a discussion of the overall system in which the present invention may be employed.

For art glass design, the program logic for generating the resized and/or additional window design should preferably include the following considerations: First, vertical alignment and continuity of fracture, cut, and bevel lines; second, horizontal alignment and continuity of fracture, cut, and bevel lines; and third, asymmetry, symmetry or some artistic representation of thereof.

It will be appreciated that additional constraints may exist due to the design or the manufacturing process. For example, with certain art glass designs, the following additional considerations may also be utilized. First, a minimum glass size may be imposed. A minimum reasonable size (e.g., approximately 2 square inches) may be applied to each design. Second, a maximum glass size may be imposed. A maximum reasonable size (e.g., approximately 2 square feet) may be applied to each design. Third, a limitation on the complexity of the glass shape, based on shapes that could easily be broken during the manufacturing process, may be imposed. Fourth, a specified glass cutting order may be imposed. For example, the order of the glass cutting may be related to the generation of the glass within the rule based design system. Fifth, a came cutting order might be imposed. However, preferably, the came cutting order should not affect the design process. Instead, this may be considered a post process in the final design.

Figure 4A:
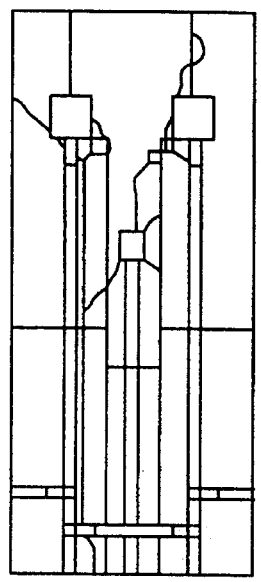
Figure 4B:
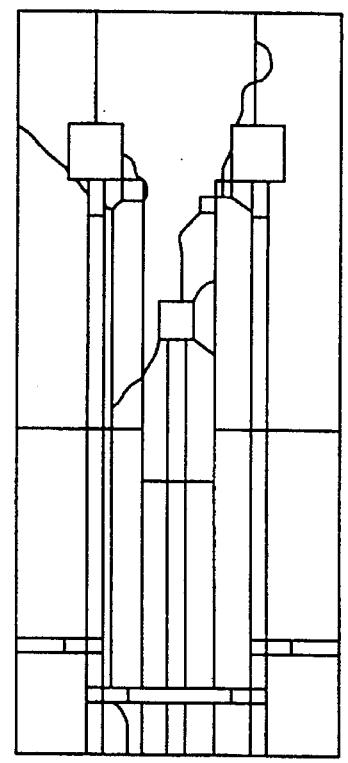
Figure 4C:
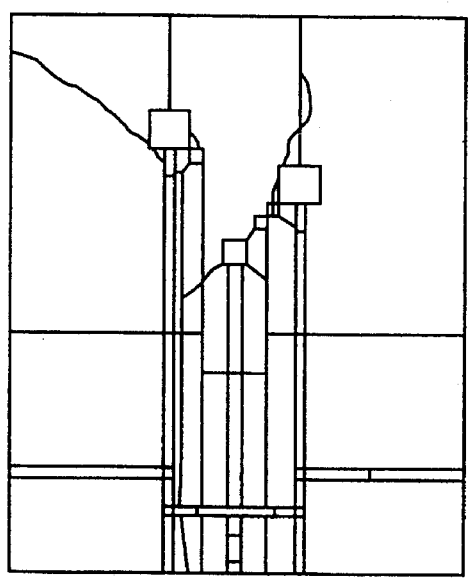

FIGS. 4a–4e illustrate the various manners in which a parent design (FIG. 4a) can be resized or expanded into additional panels. FIG. 4b illustrates a panel which is taller than the parent design and which may require utilizing a spring point file (described below) in order to provide a different size jewel. FIG. 4c illustrates a wider panel in which the main elements of the design are maintained at an aesthetic distance from one another and are not expanded proportionally. FIG. 4d illustrates a complimentary (e.g., a mirror image) panel created from the parent design. FIG. 4e illustrates breaking the parent into upper and lower portions and maintaining alignment of the various vertical lines. It will be appreciated that the designs illustrated in FIGS. 4a–4e are merely representative.

Figure 1:
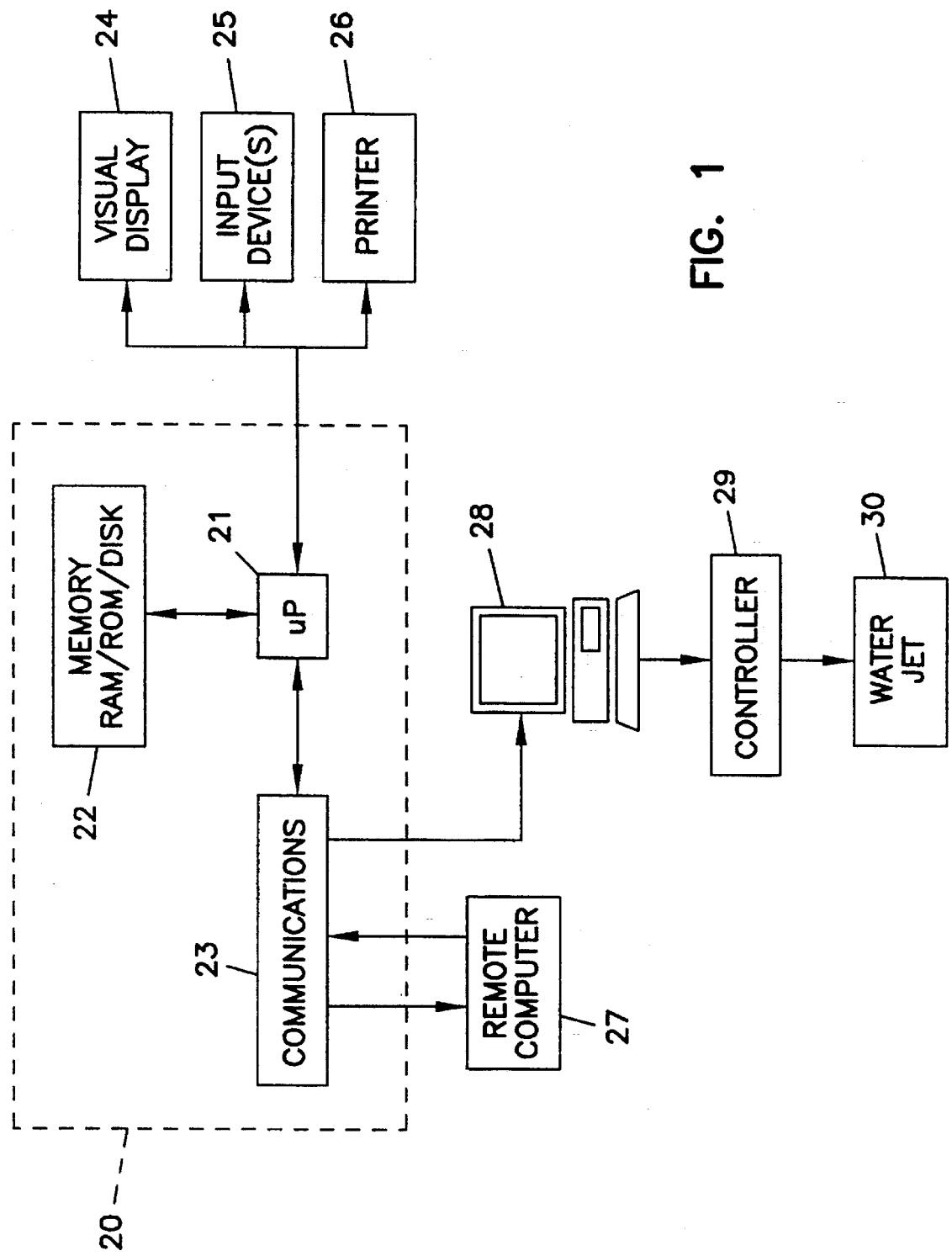
FIG. 1 is a block diagram illustrating the computer system on which the present invention may be utilized.

Referring now to FIG. 1, there is illustrated a preferred embodiment rule based/parametric design apparatus configured in accordance with the principles of the present invention. A multipurpose computer 20 for operating a software program which performs the rule based design steps is illustrated in FIG. 1. Also illustrated in FIG. 1 are computer peripheral components 24, 25, 26, a remote computer 27, a manufacturing computer 28 and a waterjet cutting device 30 with its attendant controller 29. In the preferred embodiment, computer 20 is a Macintosh style computer manufactured by Apple Computer Corporation. However, it will be appreciated that the computer 20 might also be an IBM/DOS AT style computer, preferably with a 486 style chip, or a UNIX based work station.

The computer 20 is illustrated in FIG. 1 as including a microprocessor 21, various memory devices 22 (e.g., RAM, ROM, EEPROM, floppy and hard disks, etc.) and a communications block 23 for communicating with remote computers, etc. It will be appreciated that the communications block 23 can be a network card, an RS-232 port and/or modem, and other various communications devices which are well known in the art.

The computer 20 peripheral devices can include a printer 26, input device 25 (which can include a keyboard, a light pointing pen, a mouse, etc.), and a visual display 24 such as a monitor.

The remote computer 27 may be the source of the parent design, or the parent design may be stored in one or more of the memory devices block 22. It will also be understood that the parent design might also be completed and stored only in the RAM memory of memory devices block 22 and immediately resized.

The manufacturing engine computer 28 utilizes the resized and additional window information to drive the controller 29 and waterjet 30 to cut the various panes of glass in the design. A further description of the preferred manufacturing engine computer 28 and the programming steps used in the process to cut the glass may be found in the related application filed Feb. 11, 1994, titled "Waterjet Cutting Tool Interface Software" (U.S. Ser. No. 08/195, 166), the inventors being Thomas Varghese, Jason Bright, and Randall W. Smith, which is commonly assigned to the assignee of this application, and which is hereby incorporated herein by reference.

Figure 2:
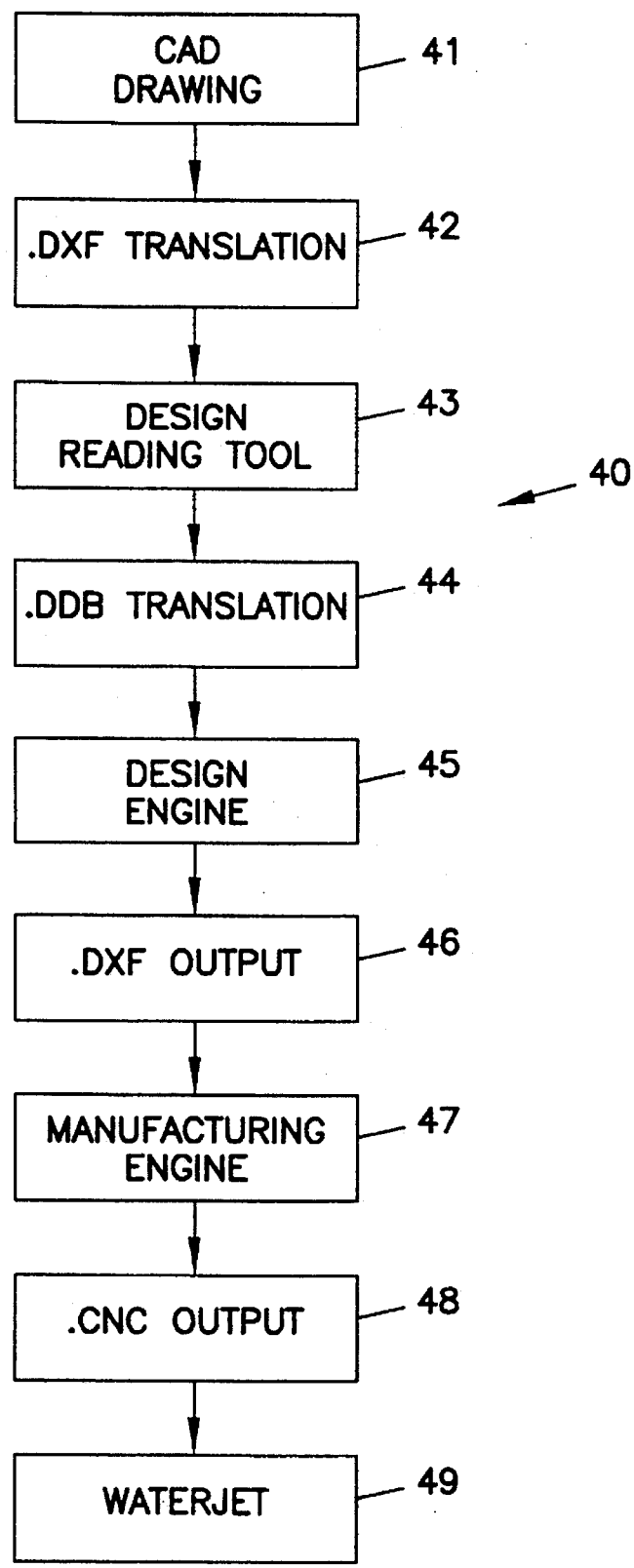
FIG. 2 is a block diagram of a logical flow of the steps performed to move from creation of a parent art glass design to the manufacture of the various glass elements.

Referring now to FIG. 2, an overall process flow chart is illustrated with the overall flow designated generally at 40. The first block 41 indicates the original parent design. The design engine software program includes a graphical user interface for design entry. A graphical interface is more intuitive and easier to make changes in. Accordingly, the user (artist/designer) enters the design and the rules for each design in a sophisticated CAD environment like Vellum from Ashlar Inc. at block 41. This is translated into an intermediate format called .dxf at block 42. The .dxf format, however, was found to be too cumbersome with much of the information being useless to the design engine. There was also much information which was needed by the design engine that was required to be recreated every time. This would have been very time consuming and unnecessary. For these reasons in the preferred embodiment, the .dxf file is converted to an internal proprietary database format referred to herein as .dbb. The translation occurs at block 43 by the Design Reading Tool, a software program which translates the .dxf files into the .dbb files illustrated at block 44. The .dbb format contains not only the geometric and text entities, but also information regarding panes (a shape consisting of geometric entities). All of this extra information is generated once and stored in the .dbb file. By using this format, the file sizes are reduced by about a factor of 3–10.

An example of the .dbb database file format is illustrated in the following Table 1:

TABLE 1

DDVER04 -- DESIGN DATABASE VER 4.0

START CAME
180
235
360
END CAME

START TEXT
B1X1
CAME: PHANTOM = 180, CONTINUOUS = 235, BORDER = 360
B.75X.75
B.75X.75
.
.
.
2
2
END TEXT

START PNTS
0 0
0 5.926
0 12.51765
0 12.798
0.18124 12.36308
0.33586 12.17484
0.63036 11.75405
.
.
.
11.29967 12.22287
11.41 0
11.41 5.926
11.41 7.49609

TABLE 1-continued

```
11.41  12.34056
11.41  12.798
END PNTS

START PRIMITIVES
LP; 1; 0; 0; 0; 0; 1
LP; 1; 0; 0; 0; 12; 0
LP; 1; 0; 0; 0; 1; 2
LH; 2; 0; 1; 0; 10; 1
PH; 0; 0; 1; 0; 2; 4; 5; 6; 7; 8; 11; 14; 18
LP; 1; 0; 0; 0; 2; 3
LP; 1; 0; 0; 0; 3; 69
.
.
.
AH; 5.705; 3.36508; 2; 0; 0; 5; 75; 67
AH; 5.705; 3.36508; 2; 0; 0; 5; 67; 63
BH; 0; −1; 0.5; B.154; 128; 127; 126; 125
END PRIMITIVES

START PANE
P; 0; 1; 10; 8; 7; 3; 0
P; 0; 3; 9; 13; 15; 16; 4; 2
P; 0; 19; 20; 30; 42; 138; 43; 6; 5; 4
P; 1; 0; 8; 12; 25; 27; 14; 9; 7
P; 1; 18; 14; 27; 26; 32; 28; 17; 15; 13
.
.
.
P; 0; 99; 107; 105; 103; 102; 100; 98
P; 0; 105; 108; 106; 104
M; 1; 4; 53; 61; 55; 52
M; 1; 11; 55; 61; 62; 76; 67; 64; 63; 57; 54
M; 1; 3; 57; 63; 58; 56
E; 0; 132; 131; 130; 129
END PANE
```

The first line in Table 1 indicates the version of the program that is being used to generate the database file. All lines that begin with a # is a comment line and is ignored by the reading program. The different sections of the file are marked by key words START and END. After the key words, a string is used to identify the type of data which follows.

From the example found in Table 1, it will be appreciated that the different came types are indicated by an integer value. Following the came are textual items. The text strings are printed out individually one to a line. Points follow the text in the database. These points are all of the different points used in the drawing. Points are also listed one to a line, with the X-coordinate followed by the Y-coordinate. Next in the database are geometric primitives, which appear in the format illustrated in the following Table 2:

TABLE 2

<L, A, B, C><H, L, P>;
<center point if arc or special text for Bevels>;
<came type>;
<hidden or visible>;
<scaling type>;
<priority>;
<contained points or primitives>;

L = Line
A = Arc
B = Bevel
C = Complex Objects
H = High level primitive
L = Low level primitive, part of another primitive
P = pane only primitive, exists solely to complete a pane The Came type is typically a number indicating the line in the CAME section that is to be associated with this primitive. The numbers 0 and 1 are utilized to determine whether the geometric primitive is visible or hidden (e.g., 0 if visible and 1 if hidden). Further, integers are used to determine whether the geometric primitive is a free scaling primitive, is of fixed size, or is a proportional line of a group "n" (e.g., 0 if free scaling, 1 if fixed size, and n (>1) all other numbers indicate a proportional line of group n).

The priority is indicated by an integer between 0 and 100. The number(s) following the priorities is the index into the POINT or PRIMITIVE sections, and indicates which point or primitive is associated with the current primitive. Lines, Arcs and Polylines only have points associated with them, while Bevels and Complex objects only have primitives.

The PANE section is last in the database and is in the format illustrated in Table 3:

TABLE 3

<P, M, O>;
<number of text items to follow>;
<indices to text items if any>;
<indices to primitives>;

P = Pane
M = Mull pane
E = Edge pane

It will be appreciated that a mull pane is a structural member which may be required in a large art glass window to provide additional mechanical support.

The database design entry was established to stay within the limitation of Vellum and its .dxf output capabilities. For example Vellum is only capable of 16 colors while the actual format is capable of 256. The .dxf format on the other hand is not capable of handling NURB splines. Therefore, Vellum converts all such entities into a .dxf Polyline which is a collection of points—which when connected approximate the spline. Staying within such limitations allows use of a wide variety of CAD programs and does not limit additional expansion.

Still referring to FIG. 2, once the database file is generated, the design engine can read that file at block 45 and generate an almost infinite number of designs that vary from the original in height or width. It will be understood, however, that it is not unusual to see windows that are of the same size as the database file.

Block 46 illustrates that the preferred output of the design engine is a .dxf file. However, it will be appreciated that a .ddb translation or other format output is possible. It will be appreciated by those skilled in the art that by generating an output .dxf file, a more "universal" output is provided which can be read by most CAD programs.

Block 47 illustrates that the resized art glass design may be provided to a manufacturing engine which generates cutting instructions for the various panes within the design. Block 48 illustrates the preferred .cnc output which is generally utilized by waterjet cutting device controllers, while block 49 illustrates the waterjet which cuts the pane. A more detailed discussion of a preferred method of generating cutting instructions for the panes may be found in Varghese et al incorporated by reference above.

After cutting the pane, the art glass window is assembled by applying the came, soldering the came, and placing within a frame, all as is well known in the art. A more detailed discussion of the preferred method and apparatus utilized to create and assemble the Art Glass is described in the related application filed Feb. 11, 1994, titled "Integrated Method and Apparatus for Selecting, Ordering, and Manufacturing Art Glass Panels" (U.S. Ser. No. 08/195,257), the inventors being Loren Abraham, Michael Pilla, and Jason Bright, which is commonly assigned to the assignee of this application, and which is hereby incorporated herein by reference.

For aesthetic and mechanical reasons, there needs to be a range over which a given database file should be used. The artist preferably decides these ranges and enters the information in the appropriate master file (described below) for later use by the design engine (each database file is referred to herein as a "spring point" file).

Art glass usually includes shapes cut out of glass sheets, jewels, bevels and came. There are a wide variety of each, and the user/artist must specify (to some extent) what kinds of glass objects and came are used. The more detailed specification, the more aesthetic control will be exercised over the resized designs. The following is a short summary on the handling of these items:

A. CAME

A text item such as the one below is added to the design:

CAME:CONTINUOUS=235,PHANTOM=180

The first part of the text "CAME:" specifies that came types follow. Next, a sequence of pairs of line styles and numbers are provided. The numbers are part of a pre-determined coding used by the manufacturing process to identify what type of came is to be used. For example, in the preferred embodiment, the numbers provide an indication as to the size of the came (e.g., 235 is 0.235 inches) and some numbers indicate a special type of flexible came that is distinct from the normal fixed (stiff) came. Also in the preferred embodiment, the edges of a panel always have a certain type of fixed came and the came used between panels in a larger mulled panel is a special came.

When a came is drawn it is entered using one of the above mentioned line styles. While there are geometric entities that do not have a corresponding came type, these have special uses, and in fact are not came at all. Instead, these are entered by the user to help the design engine determine constraints that would otherwise not be obvious (e.g.. HIDDEN and CENTER line styles).

B. GLASS TYPE

Once the came information is done, the regions enclosed by the cames must be specified (i.e., the type of glass, bevel, jewel, color, etc.). Glass types are specified by putting a text entity (containing a number) inside the pane (e.g., "1", "2", etc.). The default in the preferred embodiment is a "1" which also specifies the background color. Accordingly, if no text item is inserted, then it is assumed that the pane is of type 1. This number not only specifies the type of glass, but also the color. So two panes of the same glass type and different color will have different numbers. This information is used for both the preview picture for the customer and for manufacturing.

C. JEWELS

A jewel is a pre-cast piece of glass that has three dimensional qualities, usually a circle or a half circle. A numerical text entry is made similar to that discussed above for glass type. The number is later cross referenced to a stock size and color.

D. BEVELS

A bevel is a cut polished piece of rectangular glass which also come in stock sizes (an exception in the preferred embodiment is a Bevel fan). Bevels are specified by adding a text item such as the following example:

"B.75×3"

Wherein, the bevel is of size 0.75 inches by 3 inches. Bevels may also be stacked into strips, which the design engine can elongate or shorten in fixed sizes depending on the stock sizes (discussed further below).

In the preferred embodiment, the user must enter all of the information needed by the design engine via the CAD environment. In a CAD environment (such as Vellum and AutoCad), geometric entities can have attributes such as color, line style, etc. The entities can be placed in different groupings or "layers". Text can also be used to indicate special conditions. All of this is used to code the rules required by the design engine. Table 4 is an illustration of the special conditions and layers.

TABLE 4

Conditions:

Color:

1) Black: Default, entity is free scaling
2) Red: Fixed size entity
3) Yellow, Blue, Cyan, Green and Magenta:
   Entity scales proportionally to
   other entities of the same color Line Styles:

1) HIDDEN: Entities draw with this line style
   are used to control placement and
   can be of any color
2) CENTER: Mull came
3) All other line styles:
   These must specify a type of came
   and therefore must be included in
   the "CAME:" text entry
   Layer: Entities can be entered into any layer,
   however three layer name have been reserved
   for special processing:
   JOIN: Entities in this layer are joined
   together when possible. e.g. Two lines
   that have a common end point and the
   same slope could be joined to form a
   line that joins the two non-common end
   points.
   JOINWITH: An entity on this layer is joined with
   the entities on both ends of it. This
   is used to bridge lines or arcs that
   cross mulled panels.
   IGNORE: As the name implies entities in this
   layer are ignored by the resize engine
   and intermediate programs, this could be
   used to keep notes or add special
   information for manufacturing.

It will be appreciated by those skilled in the art that the entities resulting from the joining of one or more entities is of a "HIDDEN" line style and does not correspond to a larger physical piece of came. Instead, this is done to enhance placement of the smaller entities and to force alignment of some entities.

As discussed above, text items can be inserted in regions enclosed by came to denote glass type and color. However, there are other text items that serve a more sophisticated purpose. Text is also included with Bevel strips to indicate to the design engine how to scale the strip. A text example is illustrated as follows:

"B:a,b,c,R<B or T>,-d"

Here, the "B:" denotes a Bevel of variable size. The letters a,b,c and d are floating point numbers, where "a" and "b" are scale factors, and "c" is an additive constant. Any combination of these numbers can be used to determine the final size of the Bevel strip. The final equation in the preferred embodiment for determining the bevel size is:

$$\text{Bevel-size} = (a * \text{OrigBevelSize} * \text{NewWindowSize})/(\text{OrigWindowSize} + b * \text{NewWindowSize} + c)$$

Complex objects are also specified using text. A complex object is a collection of panes that are placed and/or resized together. This is useful for a "fleur de lis" or similar structure that should actually be considered a single object. A text item that starts with a "C:" and followed by a number indicates a complex object. All the panes that are part of the same complex object have the same number.

Since an art glass panel is essentially two dimensional, the third dimension (i.e., the Z-axis direction) is used for a priority scheme. This is done by setting all of the Z-coordinates of a particular geometric entity to an integer value greater than 0. Under this priority scheme, entities which have greater Z-coordinate values have higher priority.

It has been found empirically, however, that very few entities need to be placed using priority. Accordingly, the maximum range used in the preferred embodiment is between 0 and 100. The edges of a panel should always be placed first, and therefore is always assigned a Z-coordinate value of 100. This is done automatically regardless of what the user selects. This priority value is only observed by the design engine when no other information is useful in placing or constraining any entity in the entire panel.

Once the user has entered all of the above information, it is converted into a .dxf file by facilities provided by the CAD program (as discussed above with respect to blocks 41 and 42). The .dxf file is then sent through the Design Reading Tool (DRT) at block 43 to convert it into a database file .dbb at block 44.

The DRT reads the .dxf entities into the Random Access Memory (RAM) block 22 of the computer 20 and stores it as a list in a format of the data structure shown in (Object.h) shown below. All entities are broken into the smallest possible pieces. Table 5 below illustrates the steps taken by the DRT program to translate the data.

TABLE 5

1. Make sure there are no entities in the "JOINED" layer, if there are any change them to "NOT_JOINED".
2. Separate the text entities from this list into a separate text list.
3. Using the text list, generate the tables of the glass types, bevels and complex objects.
4. From both lists separate out the Grid Prototype entities.
5. Use this list to generate the necessary information about the Grid Prototypes.
6. Use the remaining list to generate information for placement in the .dbb file.
7. A list of entities that form bevels is thereby created, use this to generate the bevel edges and save this information.
8. Merge all the separate lists of Draw Primitives not including text. Use the layer information to create new DrawPrimitives that are the result of joining entities that are in the "JOIN" and "JOINWITH" layers.
9. Look through the text list and find one that has the came information. Output the information into the database file.
10. Set all the Draw Primitives that are not of the HIDDEN line type and do not have a came type associated with it to be of the default came type "0".
11. Write all the text items into the database, and mark them with the corresponding number in the sequence for later referral by Draw Primitives and Panes.
12. Find all the unique points in the drawing, and write them out to the database file. Also, mark them with the corresponding numbers in the sequence. Unique points are defined as points within a certain tolerance. This value is set to be quite low, so that the user has to be certain that the drawings are done within a very tight tolerance. Points that fall within this range are considered to be a single point. Points that fall outside this range, but are still very close, are flagged and shown to the operator. At this point the operator can either choose to ignore the warning or go back and correct the drawing.
13. Write all the Draw Primitives to the Database file marking them with the sequence number.
14. Write all Pane information into the Database file.

Design Engine

Figure 5:
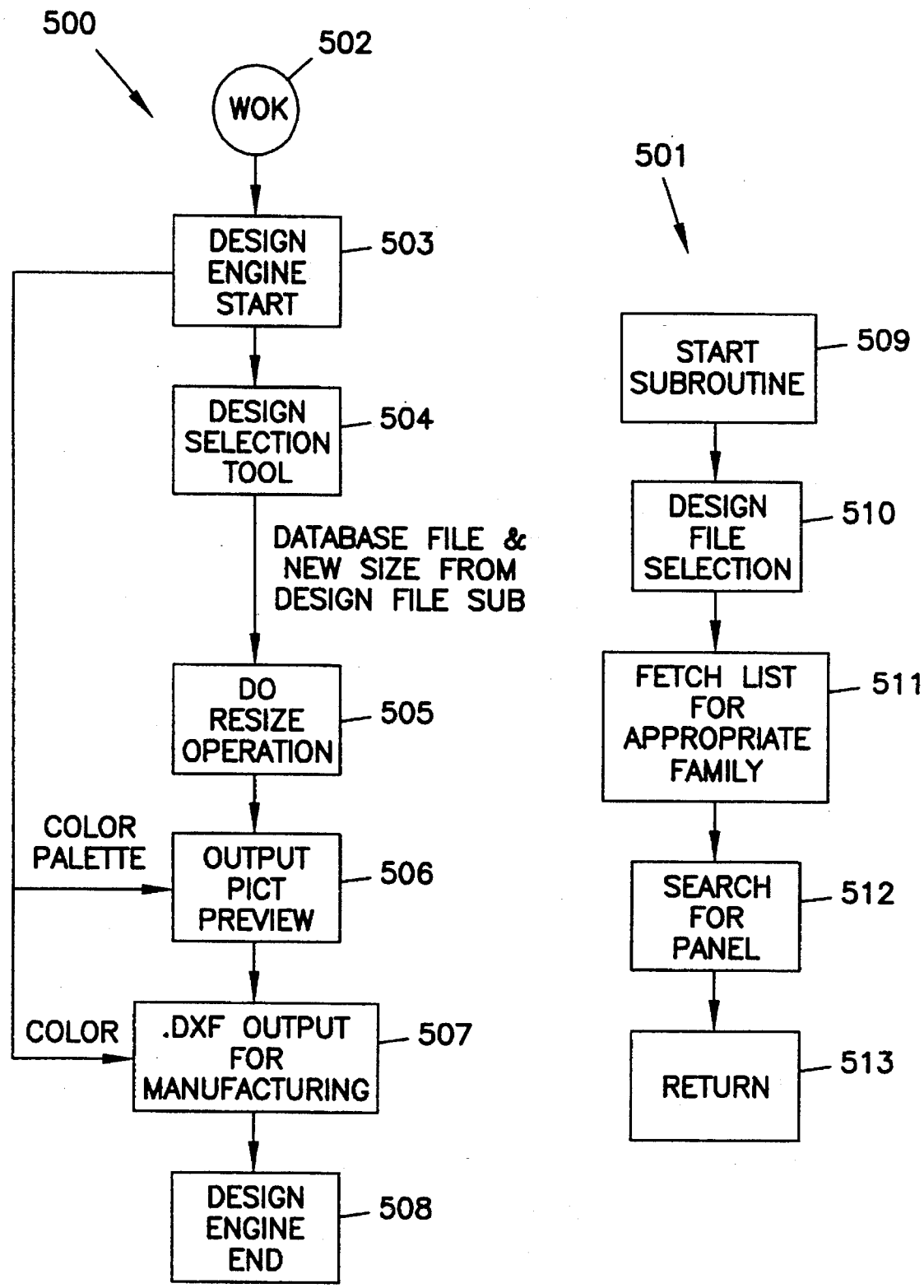
FIG. 5 is an illustration of the main computer program logic flow of the microprocessor block 101 of FIG. 1 which performs the resizing of a parent design in accordance with the principles of the present invention.

Referring now to FIG. 5, an overview of the design engine will be presented prior to discussing the various steps taken for the different draw primitives and objects. The program operation is shown generally at 500. Depending on its mode of operation, the design engine can receive its operating parameters from a number of possible sources. When operating in a first mode, the user (artist/designer) specifies the database file to use and the size of the panel to generate. While operating in a second mode with the WOK system (Window of Knowledge software program distributed by Andersen Corporation) best seen at 502, it receives an "Apple Event" (containing the design family name, the size of the panel to be generated, the type of panel, color palettes, etc). This starts the design engine routine at block 503. Next at block 504, the design selection tool is invoked. The design engine then invokes the Design File Selection subroutine, illustrated generally at 501. The function of the Design File Selection subroutine is to find the correct spring point database file. First, at block 509 the subroutine starts and proceeds to block 510 to determine the requested design. Continuing to block 511 the subprogram determines the list of available files from the appropriate family of designs. At block 512, the subprogram goes through a master list of database files and the associated information regarding the useful range of sizes that were predetermined by the artist/designer. From these files, it selects the database file that is closest in size and passes the same back to the design engine at block 513.

The design engine reads in the database file at block 504 and stores the information in the appropriate data structures. Continuing to block 505, the design engine looks through the entire list of objects to find the object with the highest priority that has not been placed. The outer edge is placed first since it always has the highest priority. The design engine then proceeds to place the objects that form the edge given the information about the size of the panel to be generated. A brief summary of the process to place draw primitives/objects is provided next and a more detailed discussion for each type of draw primitive/object is provided further below.

Placing each object requires placing the end points of lines, the end points and centers of arcs/circles, end points of polylines, etc. Placing a point requires calculating its x and y coordinate. Each point maintains two x and two y values, one being the original value and one the newly computed value. A point may be used by more than one primitive and, thus, has more than one "parent". When it is possible to calculate an x or y value, all other parents are notified of this change and are asked to check if any its points can have an x or y value computed. This in turn calls the parents of the new point. This results in a cascading chain of events that goes on until no new information is found.

It is possible for an object to produce a change that feeds back to itself and produce a new change that contradicts the original setup. This could result in an infinite loop and also have other undesirable effects. To counter this, an object once modified sets a flag indicating it is "busy". This remains in effect until all the possible changes in other objects (resulting from changes in points in the current object) are done. That is to say until all the "notification" functions return. If a change does result in information feeding back to an object that is "busy", the chain of messages or placements is terminated. So no new changes are made in the object and so no new changes occur to its points. These steps are repeated until all objects are placed.

There are objects in a separate list that are used for forming panes that are not "placed" in the normal course of events. Accordingly, at this point of the process, it is possible to provide the user with a preview of the generated window at block 506. The cost of the window might also be computed using a predetermined formula. Such a formula preferably takes into account the approximate square footage of each kind of glass, the number and dimensions of the bevels, jewels, etc., length of came, and the number of joints that need to be soldered. At block 507, the design engine generates a .dxf (Drawing eXchange File) format file that can used to for manufacturing the window, and the program logic ends at block 508.

As noted above, the design database file contains detailed information concerning the objects. The came information is stored in a table for later use during DXF output. All the points are put into a global list of points. The primitives that follow the points are added into a global primitive list. They are also added to another list called the "allPObjects" as long as they are not of type "PaneOnly" or are part of a more complex object (e.g.. bevel stack or complex object). "PaneOnly" objects are kept in a separate list for later use.

The list called "allPObjects" is the list which the design engine uses to generate a panel. Text items are also stored in a table for later access, they contain glass color and other information that needs to be passed on to the manufacturing files. Further, pane information is stored in "PANE" and comprises a collection of primitives that form an enclosed space and is occupied by a pane of glass, a jewel or a bevel. This is useful for providing previews to the user of a panel. One of the items in this section is the edge pane which is the actual outer edge of the panel.

The Resize Engine mainly tries to place objects in the "allPObjects" list which may include:

1) Lines
2) Arcs
3) Circles
4) Polylines
5) Bevels
6) Complex Objects
7) Grid Objects The first four types of objects are preferably considered the basic primitives (e.g., for art glass design), and the remaining three consist of one or more primitives arranged in a special sequence. The primitives usually indicate a physical piece of came that separates two pieces of glass. However, there are primitives that are added to help the design engine in its function and are not physical. Placing an object involves placing its points. In the following sections a description is provided to illustrate placement and the occurrences which are initiated when placement messages are sent to points and the above mentioned objects.

Points

Points contain the original coordinates (from the database file), new coordinates found by the design engine, two flags that indicate whether either one of the coordinates have been fixed, and a list of basic primitives that use the point (i.e. parents of the point). Points can be sent many types of messages. Three of the main ones are: xFix, yFix or xyFix. As the names imply, the messages fix the x, y or both coordinates and contain the appropriate value(s) for the x and/or y coordinate. When one of these messages is received along with the new value of the coordinate, then it is fixed and the calling parent is marked "busy." Also, all other parents are notified about the change. When no information is available about the new position, then other messages are used to try to negotiate values. These messages include pleasePosition and checkOtherConstraints. Both of these messages request the parents "guidance" in positioning the point. Preferably the parent(s) attempt to constrain one or both of the coordinates such that it can be fixed. For example, if a line and arc both contain the point, then the point must be at the intersection of the two objects. If enough is known about the size and position of the two parents, then the coordinate values can be determined. This can get quite complex and is only used when simpler methods fail—additionally, by using the latter method, there is no assurance that convergence will result. However, if some information is gained, then all parents are notified of the change.

Grids

The Grid object actually consists of two parts: a grid area and a grid prototype. They are both contained in a rectangular bounding box. The grid prototype simply "tiles" within the grid area (i.e., it is replicated as many times as possible within the grid area). The grid prototype can change in size if necessary so that there is an integer number of copies of the prototype.

First the grid area has to be placed. If any of the end points are known, then the remaining unknown end points (four total) are derived if possible from the known points. Otherwise they are scaled using the scale ratios (x and y) between the original window and the new window sizes.

Next the size of the prototype is determined. The new size will be the original size divided by the original size of the grid area times the size of the new area. Thus, the number of elements will remain the same as in the original. On the other hand, if the prototype has a fixed size, then the new size is computed differently. In the latter case, it is computed so that the number of copies is an integer, even though the prototype is supposed to be fixed. However, it is forced to change in shape to compensate for the change required.

Once the grid prototype has had its size fixed, then the internal objects are placed using the scaling parameters derived from the change between the old and new sizes of the grid prototype. Thereafter, all of the contents of the grid prototype are replicated into the grid area.

Complex Object

Complex objects are comprised of one or more basic entities. They are always of fixed size and, therefore, do not scale. Once any point in a complex object has been fixed the rest can be fixed by adding a fixed offset equal to the distance from the current point to the known point in the original design. This feature is seldom used since the same effect might be accomplished by fixing the sizes of the contained entities.

Bevel

A Bevel is of a fixed size and, therefore, all of the entities that comprise the bevel are also of a fixed size. The placement of the individual lines results in the placement of the bevel.

Bevel Stack

The Bevel Stack is a more sophisticated bevel. Bevel stacks have an associated equation that determines how the bevel stack scales. The parameters in this equation are explained above. Bevel stacks can be of fixed size, which makes placement quite straight forward once any corner has been fixed.

If the length is not known, then the length can be calculated using the equation mentioned above. The width of the bevel stack is always a fixed size. Once the length is known and none of the points on the bevel stack are placed, it is scaled into position using the scale parameters derived from the original and new sizes of the window. If one of the points are fixed then the remaining points can be derived (since the length and width are known).

Lines

Figure 6A:
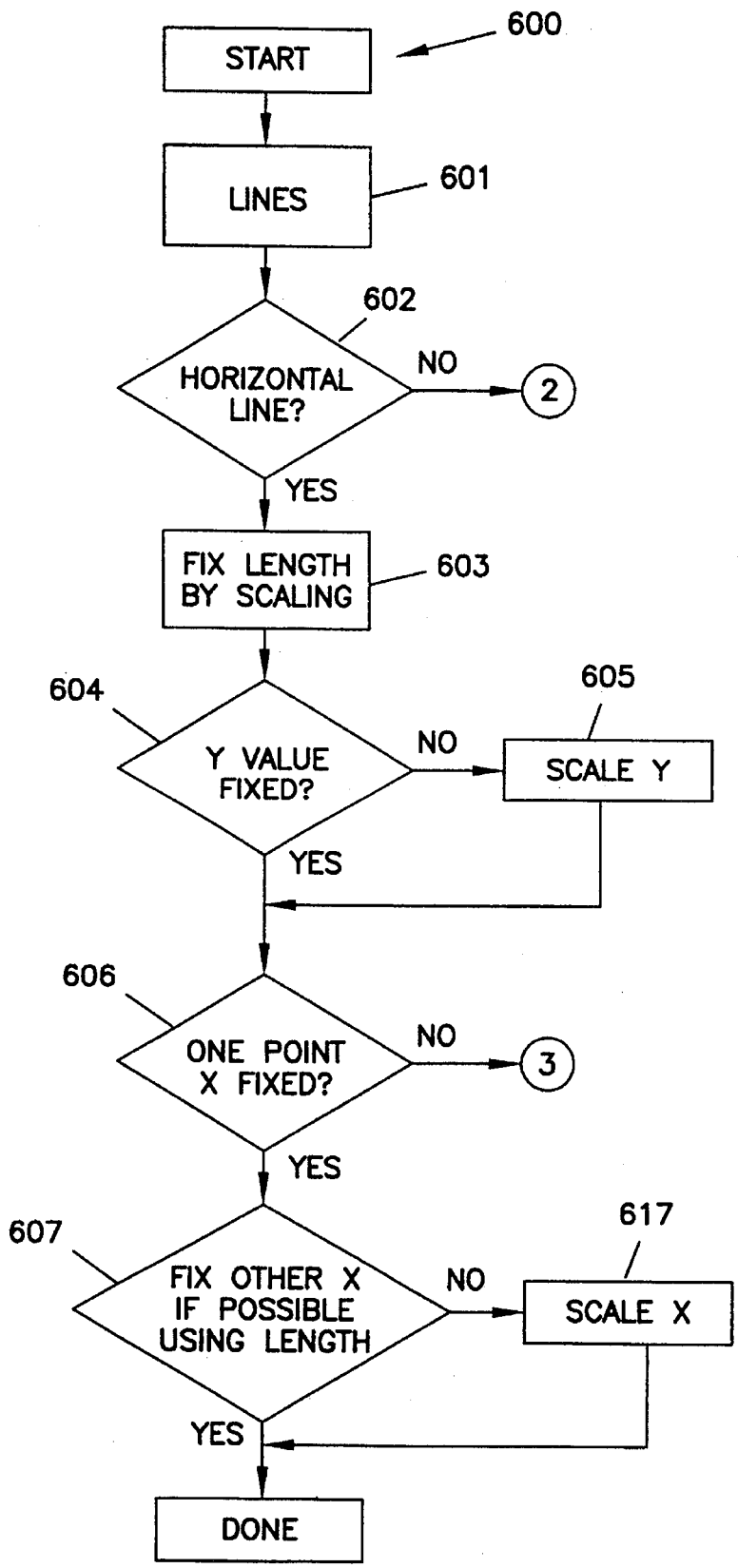
FIGS. 6a–6c are logic flow diagrams of the operations performed to resize lines.
Figure 6B:
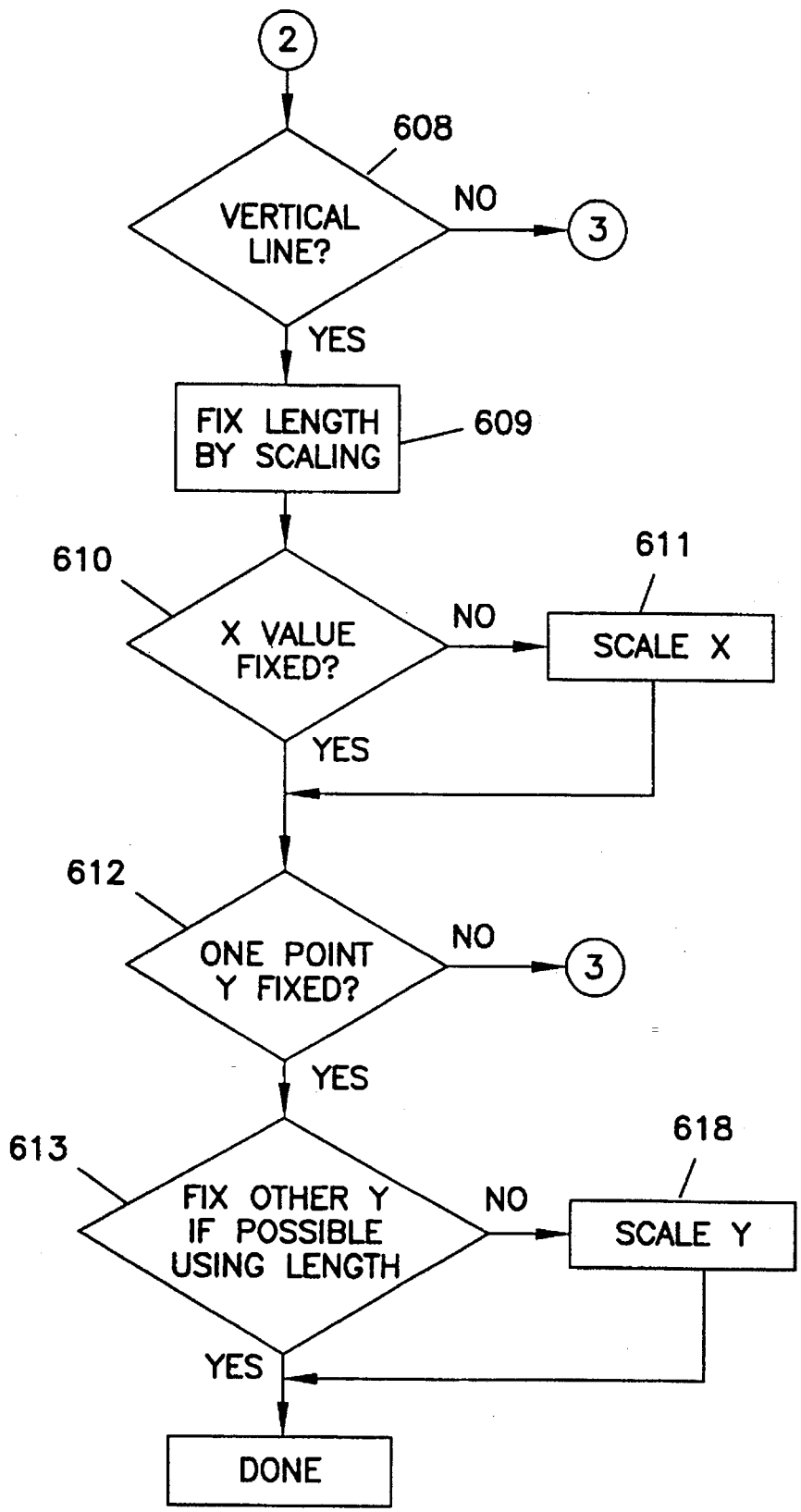
Figure 6C:
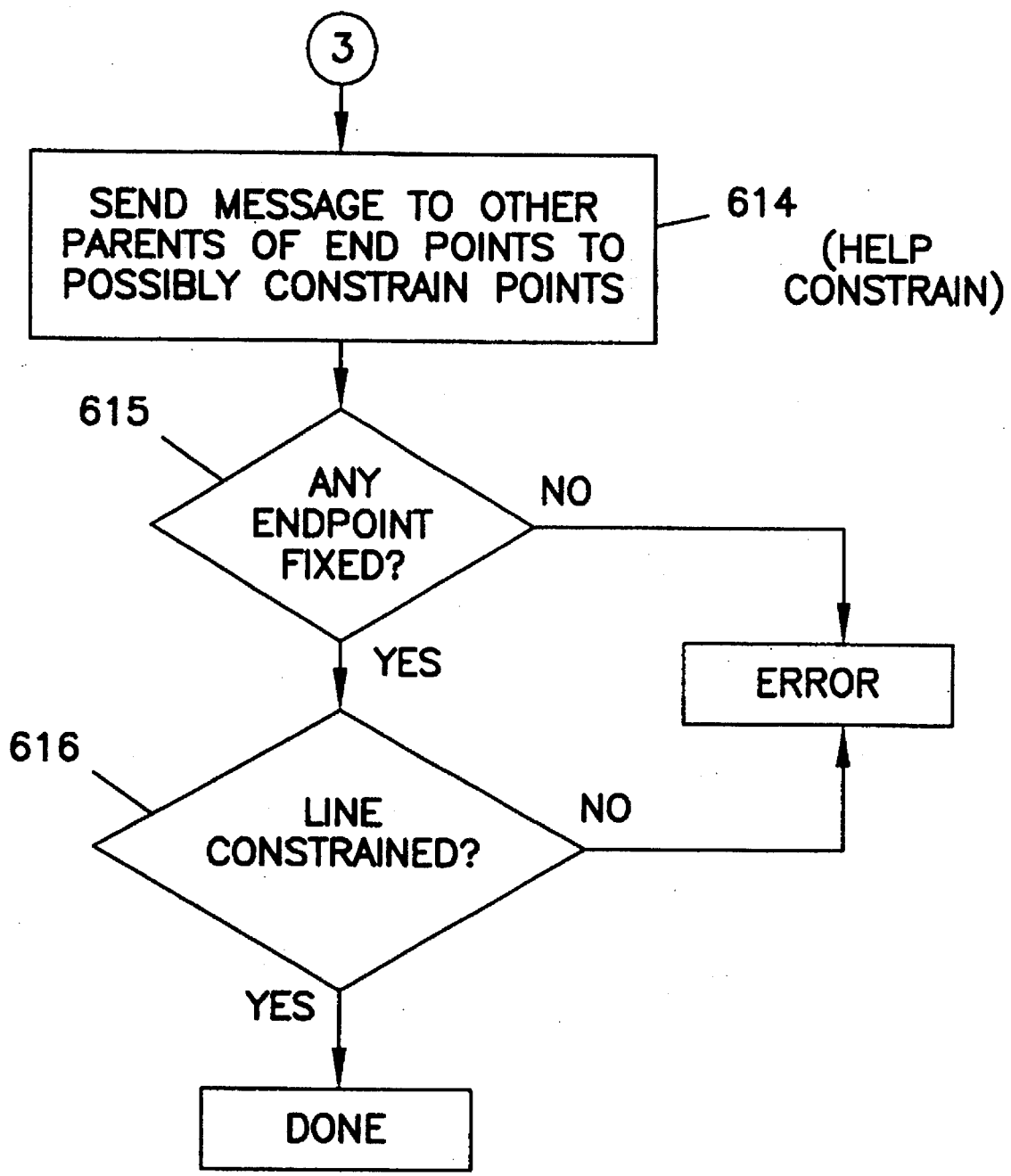

FIGS. 6a, 6b and 6c show the general flow of a line resizing routine 600 in the preferred design engine. Lines are objects which consist primarily of two end points, although they may also contain additional internal points that lie between the two end points. Different types of lines are handled in differing manners by the preferred design engine. Lines can be designated one of three types: horizontal, vertical or sloped. Horizontal and vertical lines typically require less processing than sloped lines since horizontal and vertical lines have a fixed y or x coordinate, respectively. Thus, for a horizontal line, fixing one y coordinate fixes the other y coordinates for the points on the line, and similarly, fixing one x coordinate in a vertical line fixes the x coordinate of each of the other points one the line.

As seen in FIG. 6a, the line design routine 600 is initialized in block 601. Next, the line to be resized is checked to determine if the line is a horizontal line in block 602. If the line is a horizontal line, the routine proceeds to block 603 to fix the length of the line by scaling the original length of the line by the x direction scaling ratio to generate a new length for the line.

After the line is fixed by scaling, the routine proceeds to block 604 to inquire as to whether the y value of the line is fixed. If the y value is fixed, control passes to block 606. However, if the y value is not fixed, control is diverted to block 605 to scale the y value for the line by the y direction scaling ratio to generate a new y value for the line. Also, in block 605, all of the y coordinates for the line are subsequently fixed to the new y value for the line. Control then passes to block 606.

The next step in the line resizing routine is to fix the end point x values for the line. In block 606, the routine inquires as to whether one of the end point x values is fixed. If not, control passes to block 614, which is discussed below with respect to FIG. 6c. However, if one of the end point x values is fixed, the routine proceeds to block 607 to fix the other end point x value if possible by using the new length value determined above in block 604. If it is not possible to fix the other end in this manner, control passes to block 617 to scale the old end point x values by the x direction scaling ratio to generate new x values for the end points of the line. At this point, the routine is completed.

Returning to block 602, if the line to be resized is not a horizontal line, control is diverted to block 608 in FIG. 6b to determine whether the line is a vertical line. If the line is a vertical line, the routine proceeds much the same as for a horizontal line. First, control passes to block 609 to fix the length of the line by scaling the original length of the line by the y direction scaling ratio to generate a new length for the line.

After the line is fixed by scaling, the routine proceeds to block 610 to inquire as to whether the x value of the line is fixed. If the x value is fixed, control passes to block 612. However, if the x value is not fixed, control is diverted to block 611 to scale the x value for the line by the x direction scaling ratio to generate a new x value for the line. Also, in block 611, all of the x coordinates for the line are subsequently fixed to the new x value for the line. Control then passes to block 612.

The next step in the line resizing routine is to fix the end point y values for the line. In block 612, the routine inquires as to whether one of the end point y values is fixed. If not, control passes to block 614, which is discussed below with respect to FIG. 6c. However, if one of the end point y values is fixed, the routine proceeds to block 613 to fix the other end point y value if possible by using the new length value determined above in block 609. If it is not possible to fix the other end in this manner, control passes to block 618 to scale the old end point y values by the y direction scaling ratio to generate new y values for the end points of the line. At this point, the routine is completed.

Returning to block 608, if the line is not a vertical line, then control passes to block 614 in FIG. 6c. Also, as discussed above, block 614 is also executed whenever neither of the x or y endpoint values are fixed in the horizontal or vertical routines, respectively, as determined by blocks 606 and 612 (in FIGS. 6a and 6b, respectively). In this block, a message is sent to the other parents of the end points of the line to possibly constrain the points. In block 615, if any endpoint is fixed, the parents of the other endpoint are asked to constrain the endpoint, since one of the end points or even a coordinate may have a simpler solution. In block 616, if nothing is still constrained, the routine tries to actually position an end point using the other parents' constraints. If this fails, the routine tries the other end point. At this point, if no solution has been found, this indicates that the designer has not provided enough constraints, so the process is halted and an error message is signaled.

Proportional lines are special types of line objects which are handled somewhat differently by the line resizing routine. Proportional lines, in addition to having all of the other properties of a line objects, also have an added feature of being grouped together with other lines depending on the color of the lines. When one line in a group has its length fixed, all of the other lines in the group also have their lengths fixed. Further, a fixed size line can be considered to be a special case of the proportional line having a fixed length.

Arcs

An arc resizing routine 700 for the preferred design engine is shown in FIGS. 7a, 7b, 7c and 7d. An arc is defined as an object which includes end points, a center point and a radius value.

Figure 7A:
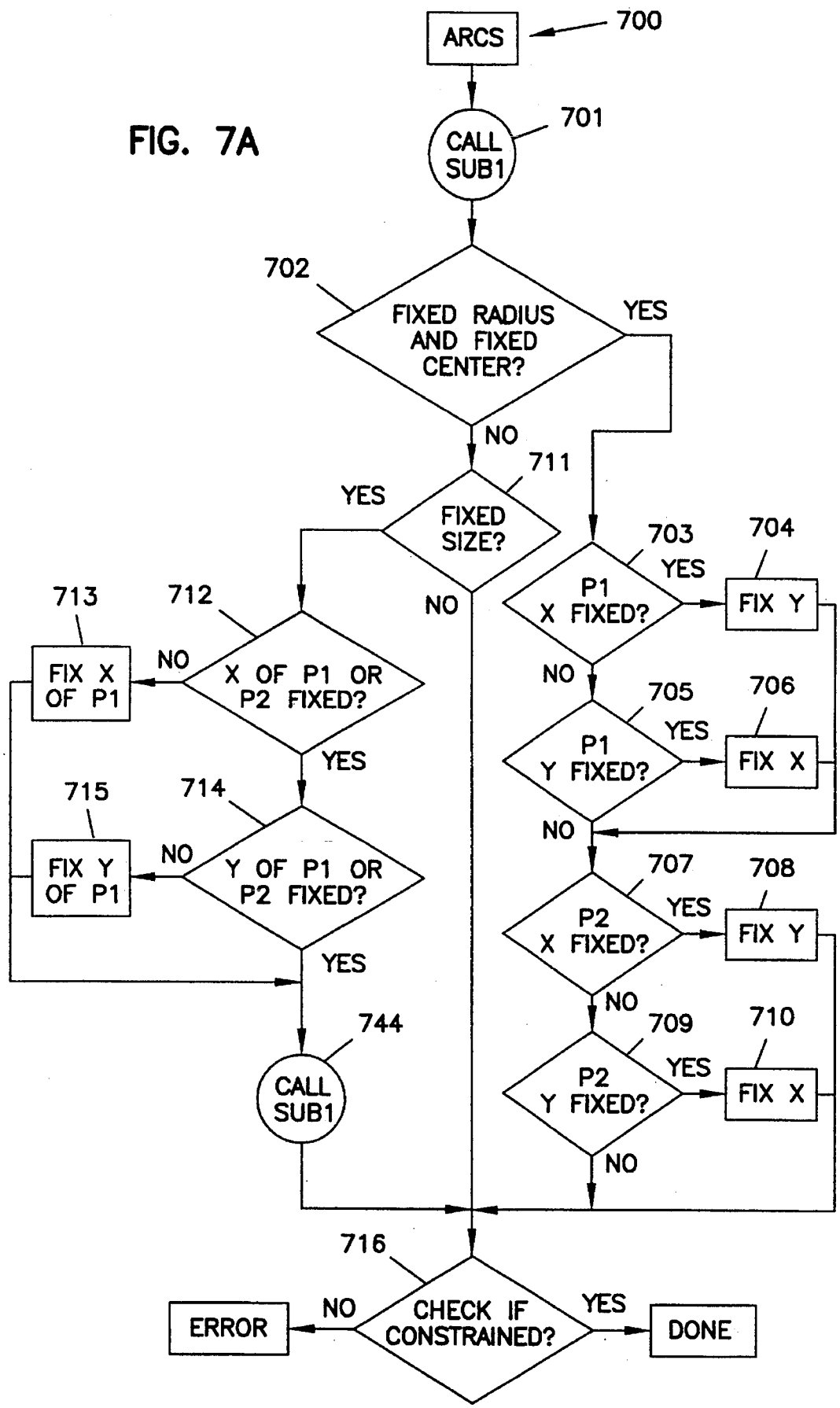
FIGS. 7a–7d are a logic flow diagrams of the operations performed to resize arcs.
Figure 7B:
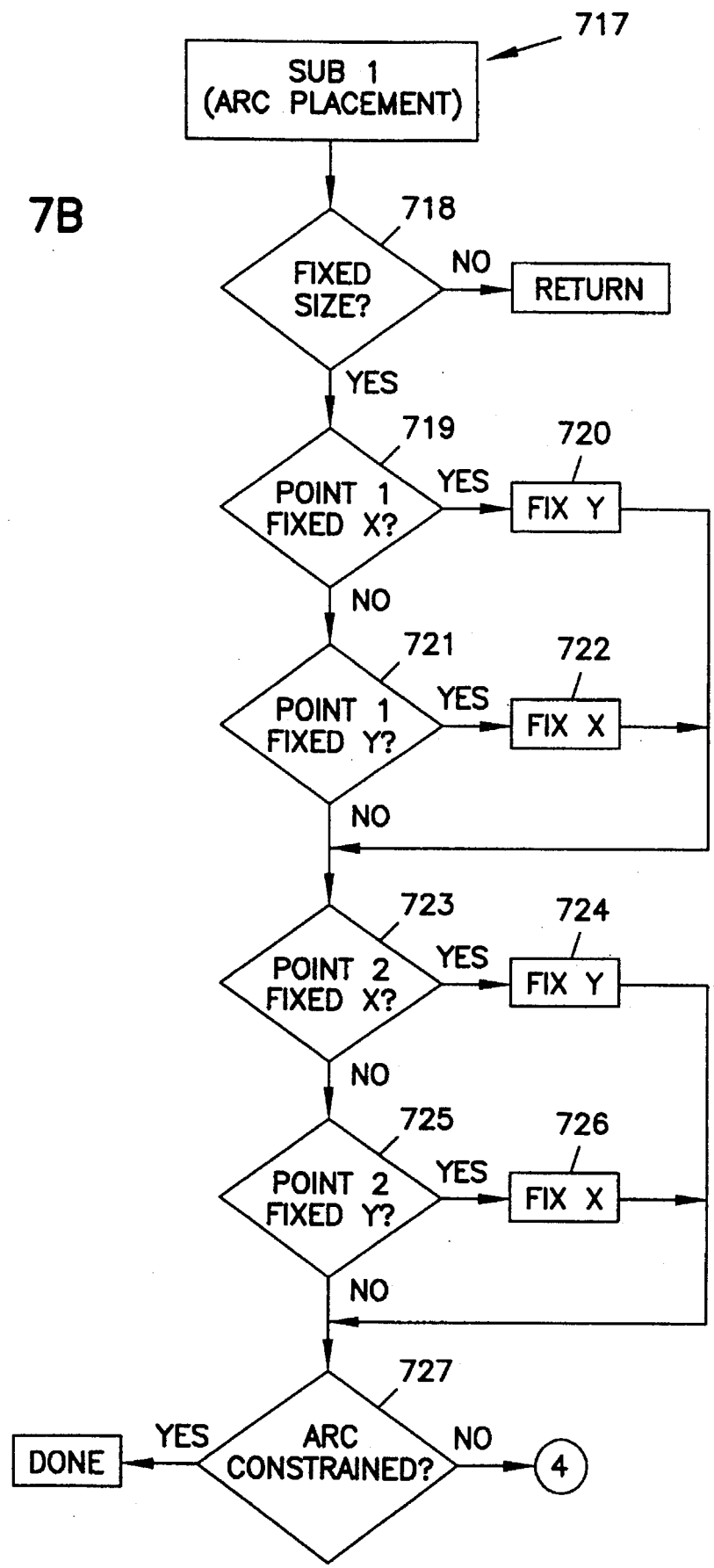

As seen in FIG. 7a, arc resizing routine 700 begins by calling a subl routine (numbered 717 and shown in FIGS. 7b, 7c and 7d) in block 701. As seen in FIG. 7b, subl routine 717 first inquires as to whether the arc is a fixed size in block 718. If it is not fixed sized, control returns to arc resizing routine 700. However, if the arc is a fixed size, subl routine 717 attempts in blocks 719–725 to find an x or y coordinate that has been fixed and calculate the other (y or x) coordinate value for each end point, since if it is possible to calculate any coordinate (x or y) point, then all other coordinates (x or y) can be fixed since they will be at the same offset from the known point as it was in the original window.

In particular, in block 719, the subl routine inquires as to whether the x value of the first point is fixed. If it is, then the y coordinate value is fixed in block 720 and control is passed to block 723. If it is not, then control passes to block 721 to inquire as to whether the y value of the first point is fixed. If it is, then the x coordinate value is fixed in block 722 and control is passed to block 723. If not, control is passed to block 723. In blocks 723–726, a similar inquiry is performed with regard to the second point—that is, if the x value of the second point is determined to be fixed in block 723, then the y value is fixed in block 724, and if the y value of the second point is determined to be fixed in block 725, then the x value is fixed in block 726.

Next, in block 727, the routine inquires as to whether the arc is completely constrained. If it is, then the routine is completed, and the arc is resized. If it is not, then control passes to block 728 in FIG. 7c. In block 728, the routine checks if the center point has been fixed. If it has and if the radius has not been fixed, the radius is calculated in block 729 if possible using a single point on the arc that is known, then control is passed to block 733.

If the center is not fixed in block 728, then in block 730, the routine inquires as to whether the radius is known. If it is, then in block 731 the center is calculated if possible from two points on the arc and the known radius, then control is passed to block 733. However, if the radius is not known, then the routine tries to triangulate the center from three known points on the arc in block 732, which also enables the routine to calculate the radius of the arc as well. Control is then passed to block 741 (seen in FIG. 7d), which is discussed in greater detail below.

Figure 7C:
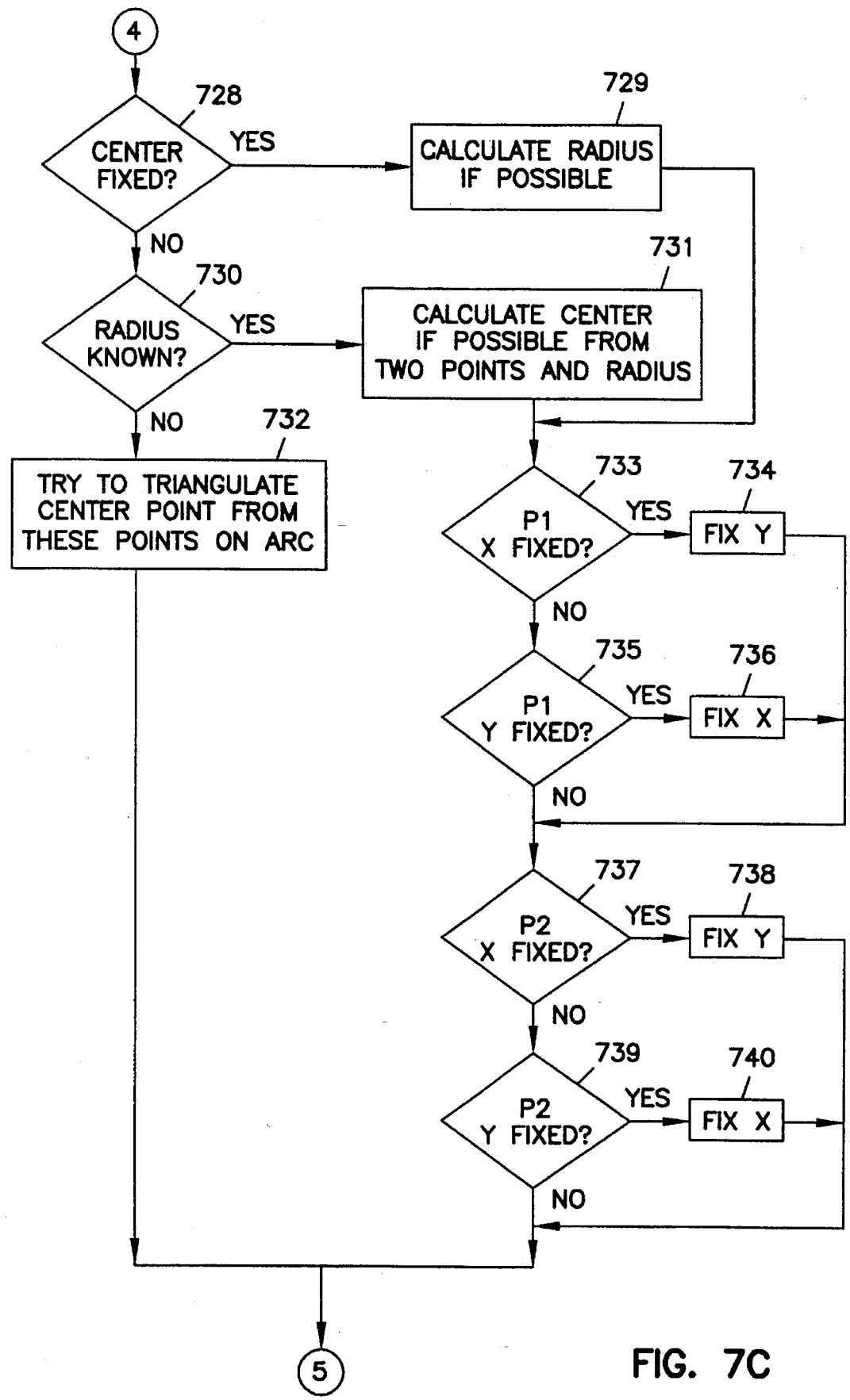
Figure 7D:
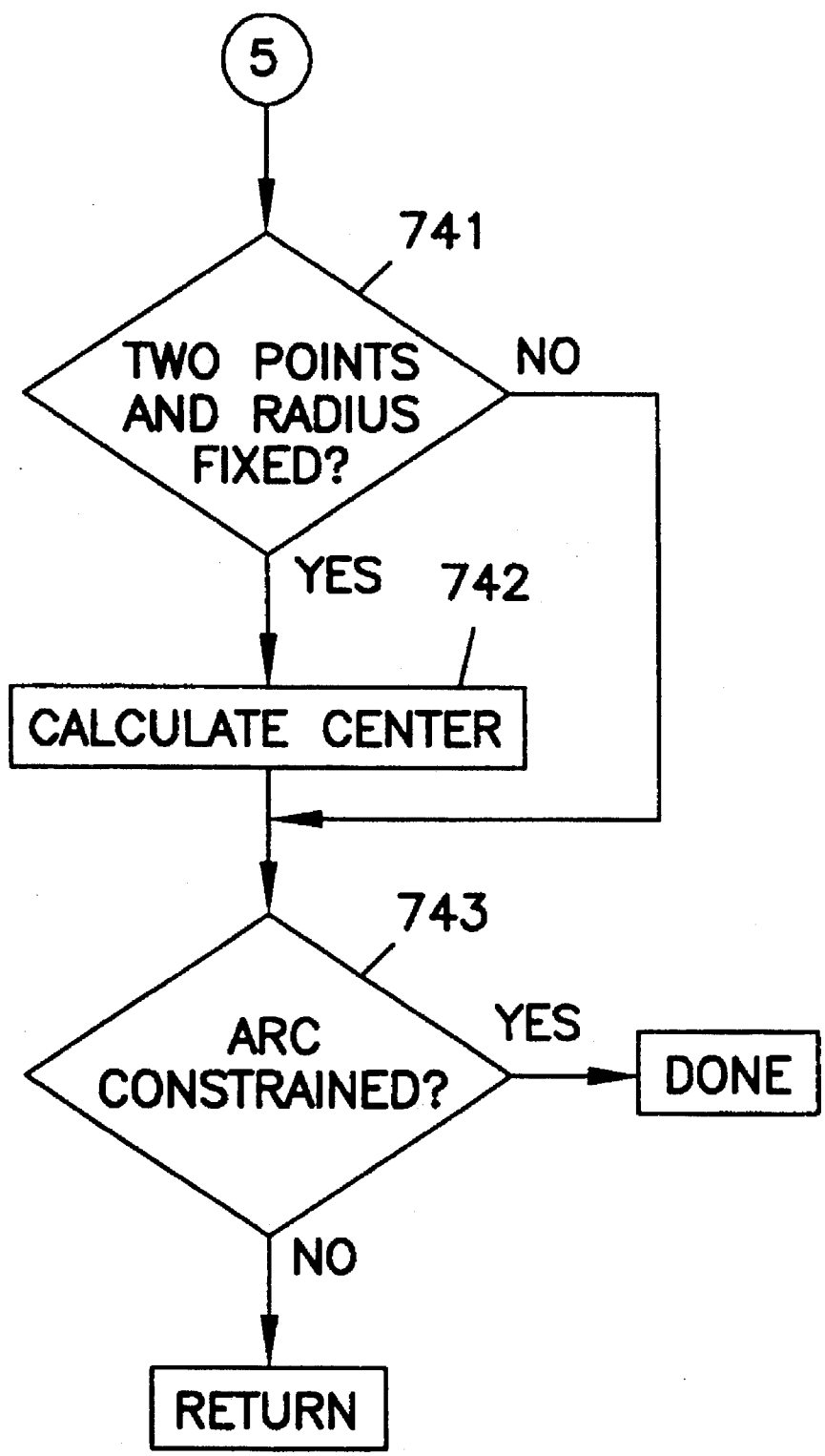

As discussed above, each of blocks 729 and 731 pass control to block 733 in FIG. 7c to try to calculate the coordinates of the points on the arc if any of the points' x or y values are fixed, given that the center and radius have been fixed. In block 733, the routine inquires whether the x value of the first point is fixed, and if it is, the y value is fixed in block 734 from the known radius and center values for the arc, then control is passed to block 737. If not, however, block 735 inquires whether the y value of the first point is fixed, and if it is, the x value is fixed in block 736 from the known radius and center values for the arc, and control is passed to block 737.

Blocks 737–740 next operate in the same fashion as blocks 733–736 to attempt to fix the x and y values of the second point. In particular, the y value is fixed in block 738 if the x value is determined to be fixed in block 737, and the x value is fixed in block 740 if the y value is determined to be fixed in block 739. Control is then passed to block 741 in FIG. 7d.

In block 741, the checks if the two points and radius are fixed. If they are not, control passes to block 743. However, if they are, then the center is calculated in block 742 before proceeding to block 743, since if the arc has both end points fixed along with the radius, the center point can only be one of two possibilities. The correct center point is chosen in block 742 by examining the relative position of the center in the original window.

Next, in block 743, the routine again checks if the arc has been completely constrained. If it has, the arc has been placed, and arc resizing routine is terminated. However, if it has not, then subl routine 717 returns to the arc resizing routine 700 for further processing.

Returning to FIG. 7a, if the arc is not completely constrained by subl routine 717, control returns to block 702 to inquire whether the radius and center point are fixed. If they are, control passes to blocks 703–706 to try to calculate the coordinates of the points on the arc if any of the points' x or y values are fixed. In block 703, the routine inquires whether the x value of the first point is fixed, and if it is, the y value is fixed in block 704 from the fixed radius and center values for the arc, then control is passed to block 707. If not, however, block 705 inquires whether the y value of the first point is fixed, and if it is, the x value is fixed in block 706 from the fixed radius and center values for the arc, and control is passed to block 707.

Blocks 707–710 next operate in the same fashion as blocks 703–706 to attempt to fix the x and y values of the second point. In particular, the y value is fixed in block 708 if the x value is determined to be fixed in block 707, and the x value is fixed in block 710 if the y value is determined to be fixed in block 709. Control then passes to block 716.

Returning to block 702, if the radius and center are not fixed, control passes to block 711 to check if the arc has a fixed size. If it doesn't, then control passes to block 716. If it does, however, control passes to blocks 712–715 to check if either x or y of both end points has been fixed. In block 712, the routine checks if the x value of the first and second point is fixed. If it is not, then the x value of the first point is fixed by scaling (in block 713), by simply scaling the point using the x direction scaling ratio. Similarly, in block 714, the routine checks if the y value of the first and second point is fixed, and if it is not, then the y value of the first point is fixed in block 715 by scaling the point using the y direction scaling ratio. Control then passes from blocks 712–715 to block 744, where subl routine 717 (shown in FIGS. 7b, 7c and 7d, and discussed above) is again executed.

Finally, in the arc resizing routine 700, control passes to block 716 to determine whether the arc is completely constrained. If it is, then the resizing routine has adequately placed the arc, and execution of the routine is completed. However, if the arc is not completely constrained, an error is posted by the routine to indicate that not enough constraints have been placed on the arc.

Circle

Figure 8:
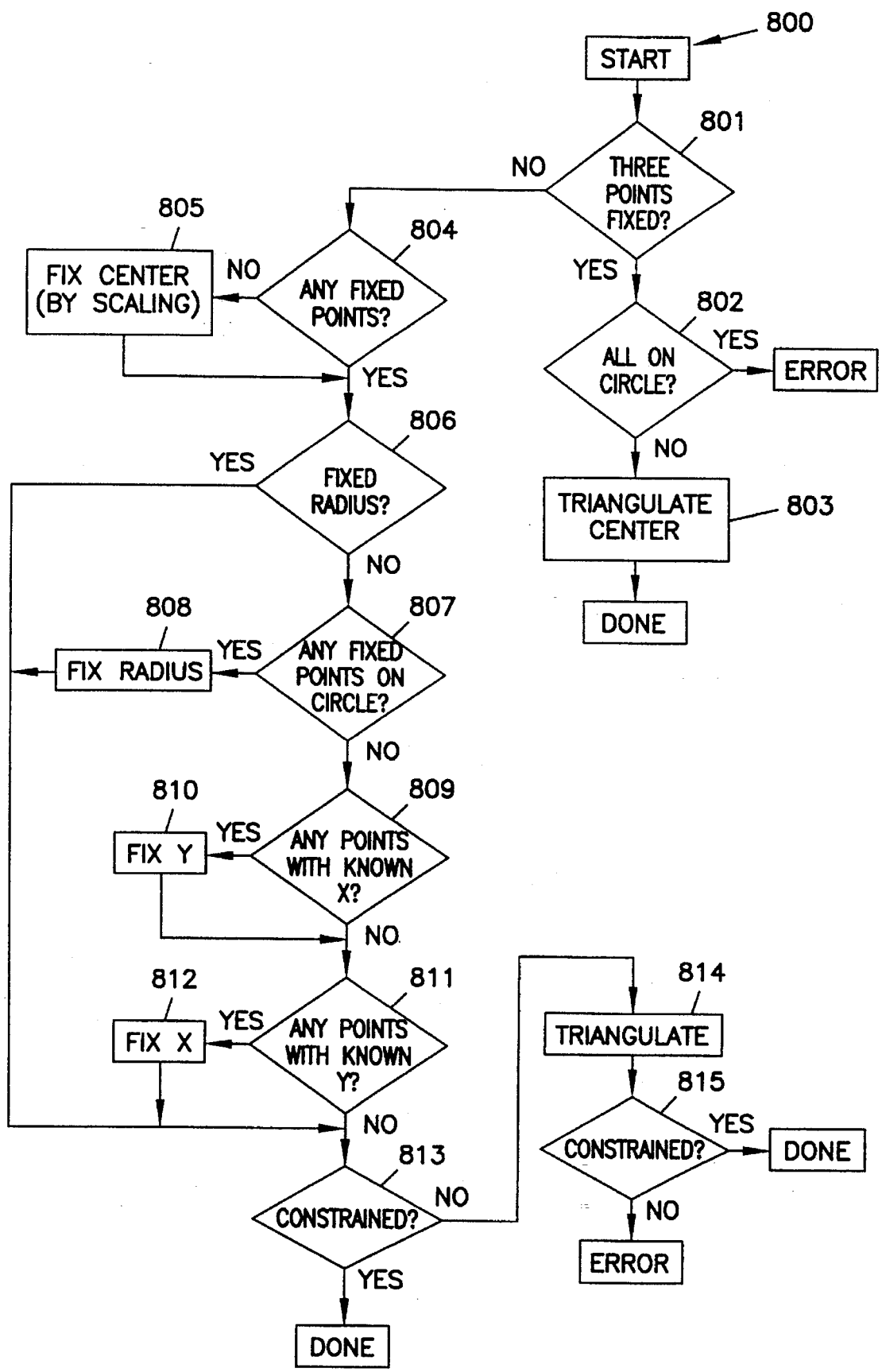
FIG. 8 is a logic flow diagram of the operations performed to resize circles.

FIG. 8 shows the circle resizing routine 800 for the preferred design engine. Resizing a circle is similar in many respects to resizing an arc. Therefore, one skilled in the art will appreciate that circle resizing may be handled as a special case in the arc resizing routine 700. However, for speed, it is preferred to include circle resizing in a separate routine.

First, in block 801, the circle resizing routine checks if three or more points have been fixed. If so, a consistency check is performed in block 802 to make sure that all of the points can fall on the same circle, and an error is signaled if they cannot. If they can, however, this indicates that the circle can be placed since the only variable (the center) can be calculated using a known triangulation method in block 803. At this point, the routine is completed.

However, if three points on the circle are not fixed, control passes to block 804 to determine whether any points on the circle (including the center) are fixed. If none of the points have been placed, the center is fixed by simply scaling the center by the x and y direction scaling ratios in block 805 before passing control to block 806.

In block 806, the routine determines if the circle is of a fixed size (i.e., it has a fixed radius). If the circle is of a fixed size, then control is diverted to block 813. It will be appreciated that with a known radius, the points on the circle may be computed by simply offsetting them from the center the same distance they were in the original window.

If the radius is not fixed (i.e., if the circle is still not placed and the center has been fixed), control is diverted to blocks 807–812 to look through the list of points on the circle and check if any of them have a fixed x or y coordinate value. If they do, then the routine computes the other value (y or x) if required and computes the radius of the circle. In particular, in block 807, if there are any fixed points on the circle, block 808 is executed to fix the radius and pass control to block 813. If there are no fixed points on the circle, block 809 is executed to determine whether any points have a known x value. If any do, then the corresponding y values for the points are fixed in block 810. Next, block 811 is executed to determine whether any points have a known y value. If any do, then the corresponding x values for the points are fixed in block 812. Execution is then passed to block 813.

In block 813, the routine determines whether the circle is completely constrained. If it is, then the routine is completed. If not, then block 814 is executed to attempt to triangulate the circle. If three or more points are fixed, then the center of the circle may be triangulated similar to block 803. Further, if two points and the radius are known, the center may be computed similar to an arc. If the center has been fixed along with the radius, the circle has been placed. This is determined by checking in block 815 to see if the circle is completely constrained. If it is, then the routine is completed. If it is not, however, an error is posted by the routine to indicate that not enough constraints have been placed on the circle.

Polyline

Figure 9:
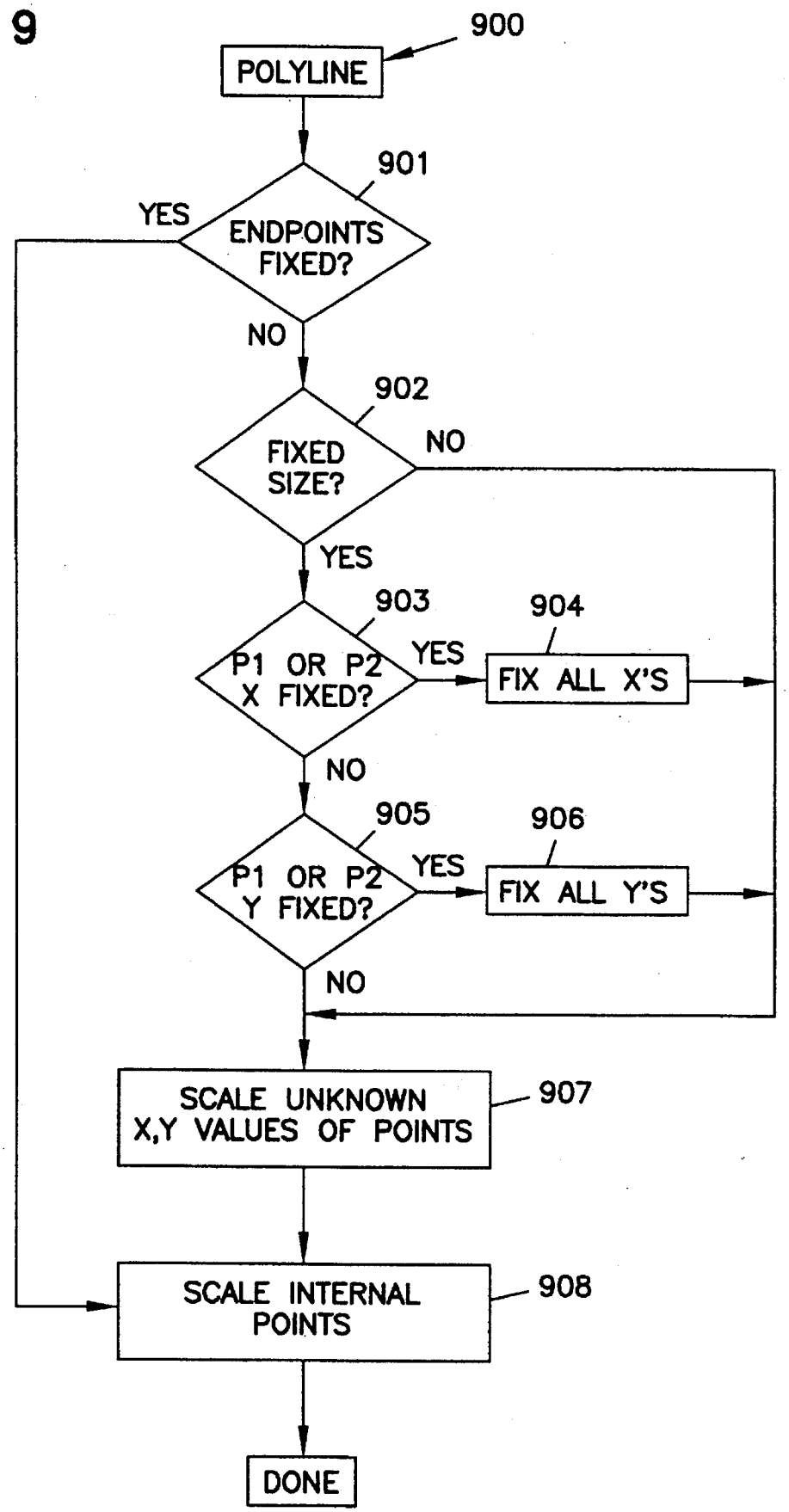
FIG. 9 is a logic flow diagram of the operations performed to resize polylines.

FIG. 9 shows a polyline resizing routine 900 for the preferred design engine. A Polyline is a collection of points connected by straight lines to approximate a smooth curve. In a polyline, only the end points are shared with other entities in a design. Each of the internal points, however, is unique to the polyline.

The preferred way to place a polyline is to fix its end points using other objects that share the same end point. If the polyline is of a low enough priority this will generally be the case. Therefore, in block 901, the routine determines whether the endpoints are fixed, and if they are, then control passes to block 908 to scale each of the internal points of the polyline such that the points maintain the same x or y scale relative to the original polyline. In effect the polyline may scale in size and its aspect (x to y) ratio may change; however, no other changes are preferably allowed.

Returning to block 901, if the endpoints are not fixed, then control passes to block 902 to determine whether the polyline has a fixed size. If it is not, control is diverted to block 907. However, if it is, then control is passed to blocks 903–906 to attempt to fix all of the x and y coordinates of the endpoints. In block 903, if an x value of either endpoint is fixed, then control is passed to block 904 to fix all of the corresponding x coordinates using the offset between the original value of the points and the original value of the fixed point. In block 905, if a y value of either endpoint is fixed, then control is passed to block 906 to fix all of the corresponding y coordinates using the offset between the original value of the points and the original value of the fixed point. Control then passes to block 907.

In block 907, the remaining unknown x and y values of the endpoints are scaled using the x and y direction scaling ratios. Further, in block 908, each of the internal points of the polyline are scaled as discussed above such that the points maintain the same x or y scale relative to the original polyline. As such, a polyline will then be adequately placed and the routine will be completed.

In Operation

It will be appreciated that entities can be visited, in order to be placed, in accordance with their rank by bounding box values. A bounding box is defined as the maximum and minimum x and y values that an entity occupies. It is a rectangle that spans the maximum and minimum coordinates of entities. However, for entities which are vertical and horizontal lines, the bounding box rectangle may collapse into a line (i.e, may have zero width or height respectively). Additional information on bounding boxes is provided in Varghese et al, incorporated by reference above.

Figure 3A:
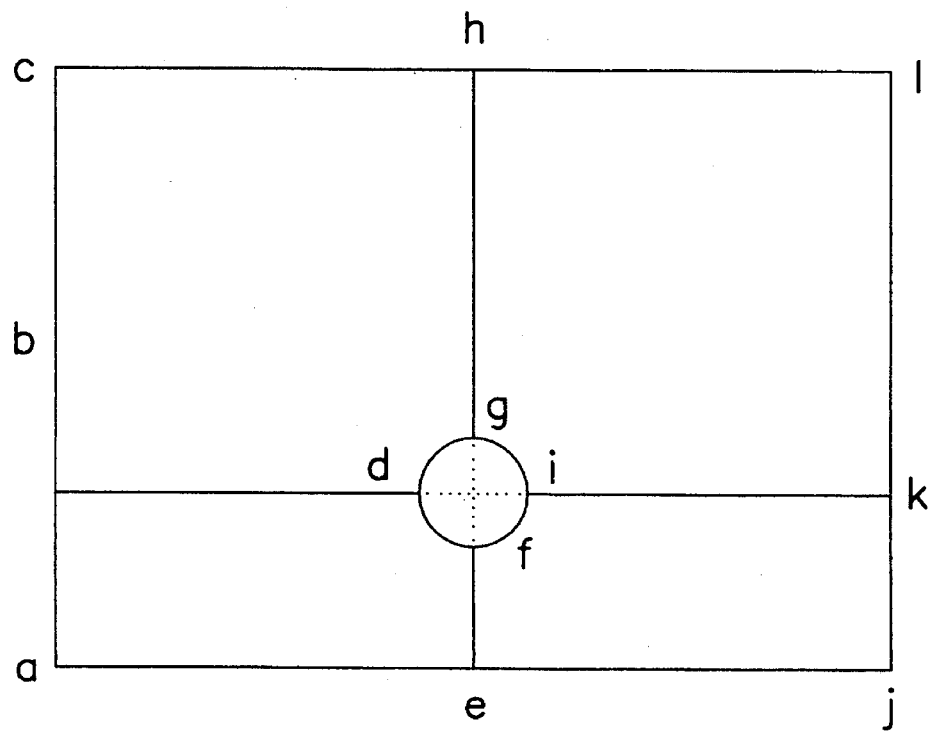
FIGS. 3a–3h illustrate the resizing of a parent design.

FIGS. 3a–3h show an example of the operation of the design engine in resizing a window design having elements a–l and a fixed size jewel (e.g., an object which is constrained to remain at its size since it has a limited number of predetermined available sizes), as shown in FIG. 3a. In operation, the design engine first attempts to place the outer boundary which is the highest priority.

Figure 3B:
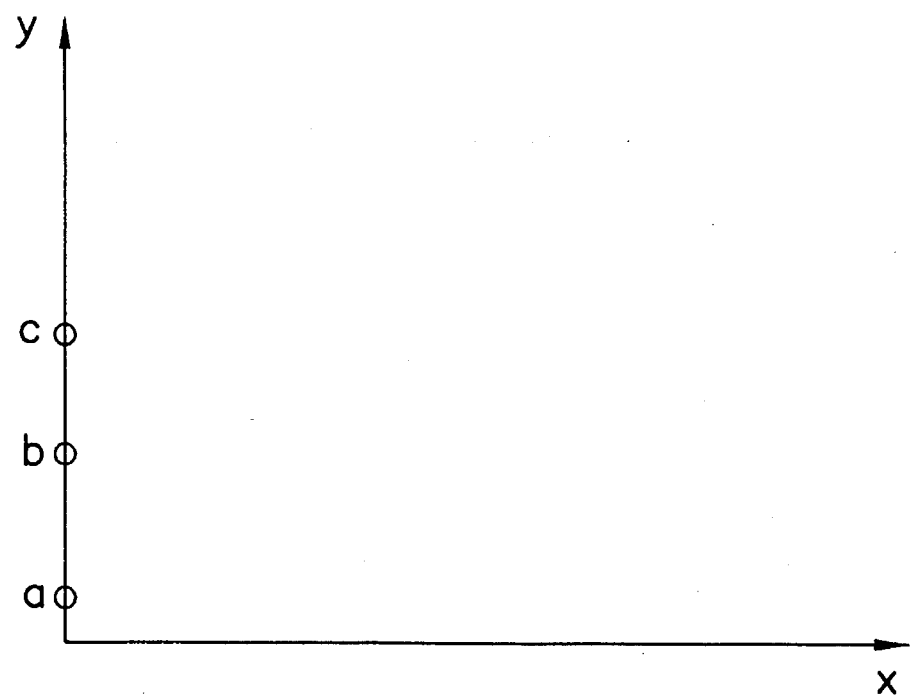
Figure 3C:
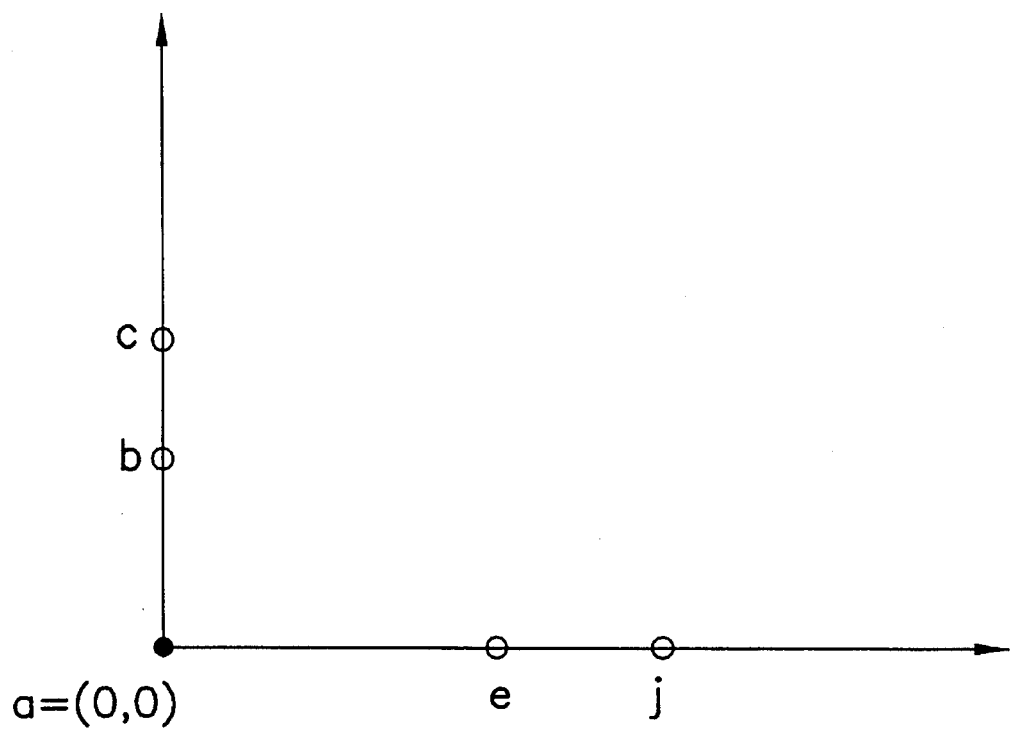
Figure 3D:
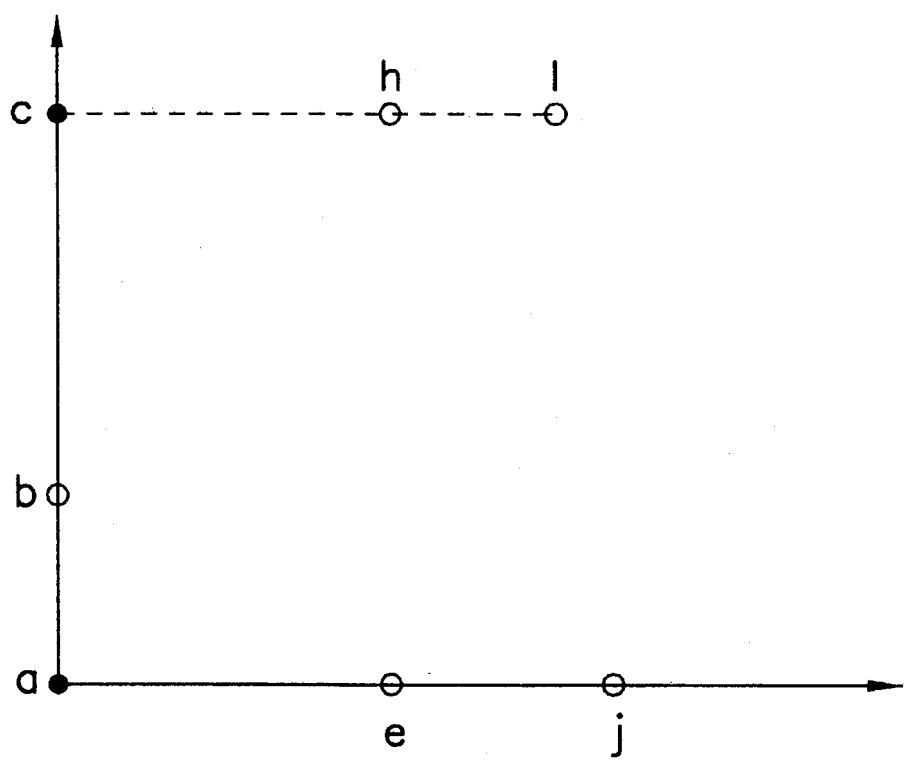

First, in FIG. 3b, the design engine attempts to place the line AC having endpoints a and c. The design engine first fixes the x coordinate of a, which in turn enables a parent of a, the line AB, to set the x coordinate of b, and then a parent of b, the line BC, to set the x coordinate of c (since AB and BC are vertical lines with the same x coordinates). Next, in FIG. 3c, the design engine fixes the y coordinate of a, which in turn enables a parent of a, the line AE, to set the y coordinate of e, and then a parent of j, the line EJ, to set the y coordinate of j (since AE and EJ are horizontal lines with the same y coordinates). Next, in FIG. 3d, the design engine fixes the y coordinate of c by scaling the old value by the y direction scaling ratio, which places the line AC. This also enables a parent of c, the line CH, to set the y coordinate of h, and then a parent of h, the line HL, to set the y coordinate of l.

Figure 3E:
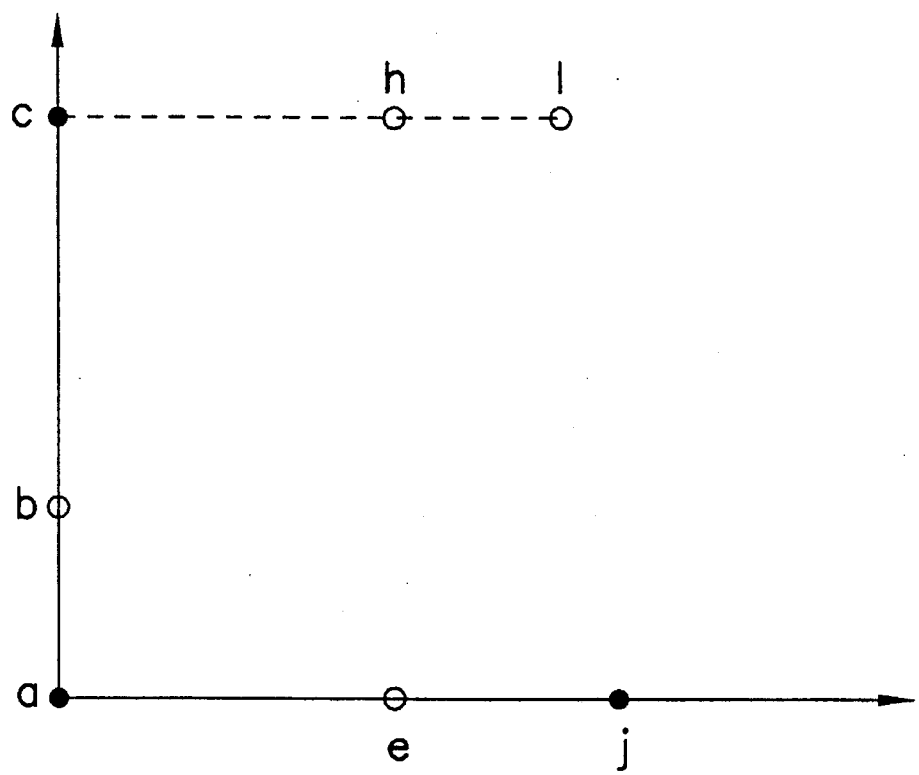
Figure 3F:
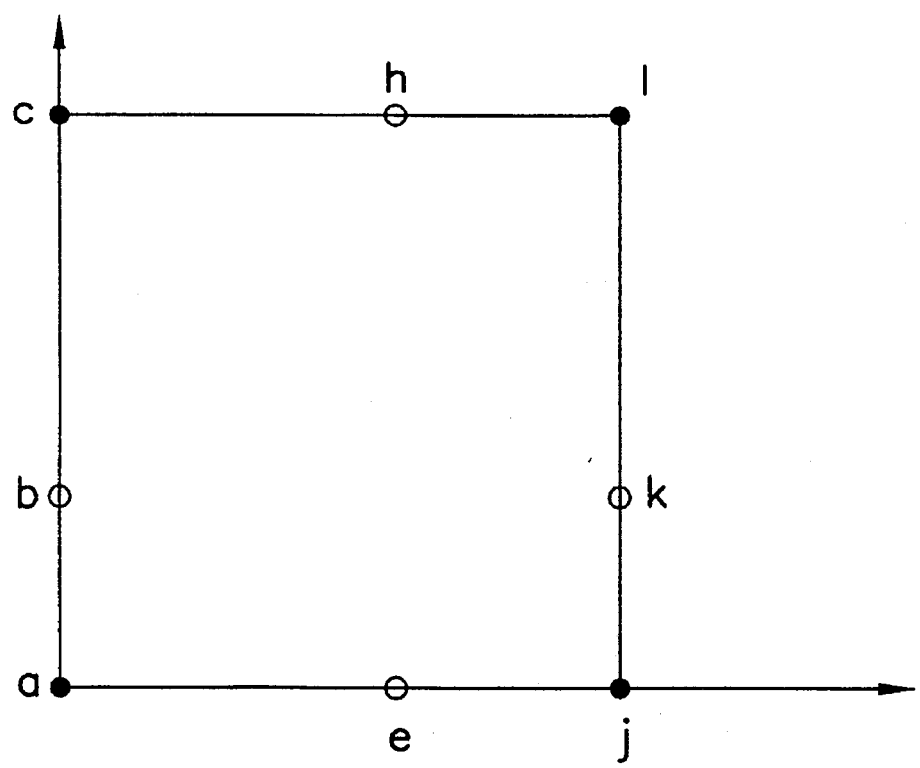

Second, in FIG. 3e, the design engine attempts to place the line AJ having endpoints a and j. The design engine first fixes the x coordinate of j by scaling the old value by the x direction scaling ratio, which places the line AJ since the y coordinate of j was fixed when placing line AC. As seen in FIG. 3f, this enables a parent of j, the line KJ, to set the x coordinate of k, and then a parent of k, the line LK, to set the x coordinate of l. At this point, the lines CL and JL are now placed, since the x and y coordinates of l were fixed while placing lines AC and AJ. Thus, the outer edge of the resized window design is now placed.

Figure 3G:
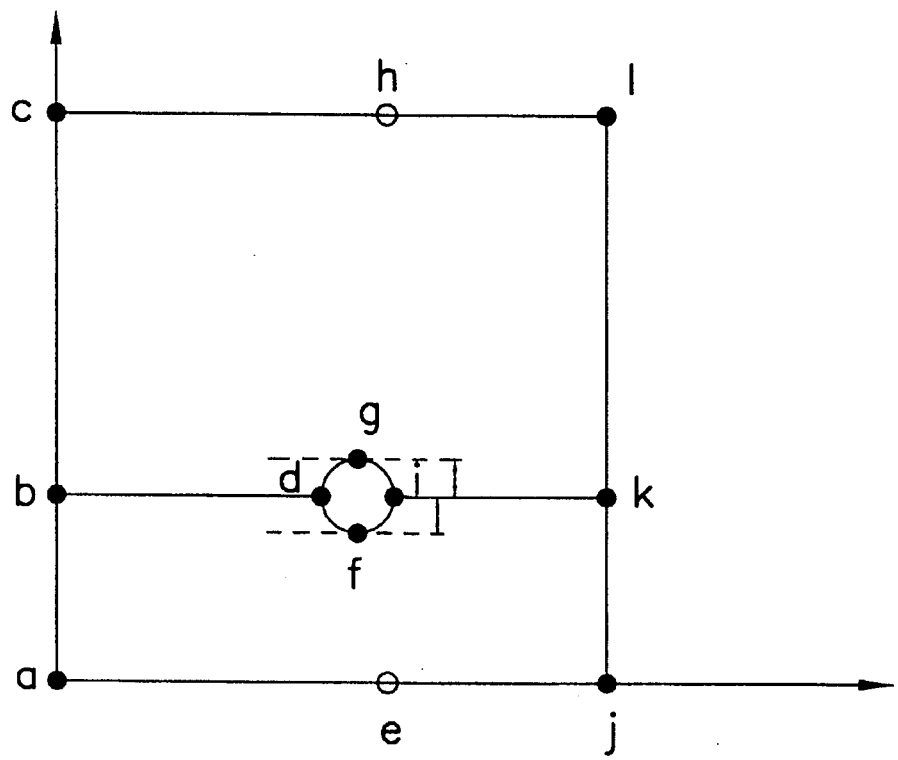

Third, in FIG. 3g, the design engine attempts to place the line AB having endpoints a and b. The y coordinate of b is determined by scaling the old value by the y direction scaling ratio, which places the line AB, since the x coordinate of b was set previously when placing line AC. This enables the y coordinates of d, f, g, i and k to be fixed, since d, i and k are defined having the same y coordinate as b, and since f and g are a known offset from the y coordinate of b (given the known dimensions of the jewel). This also places line BC, as well as lines LK and KJ (since the x coordinate of k was fixed while placing line AJ).

Figure 3H:
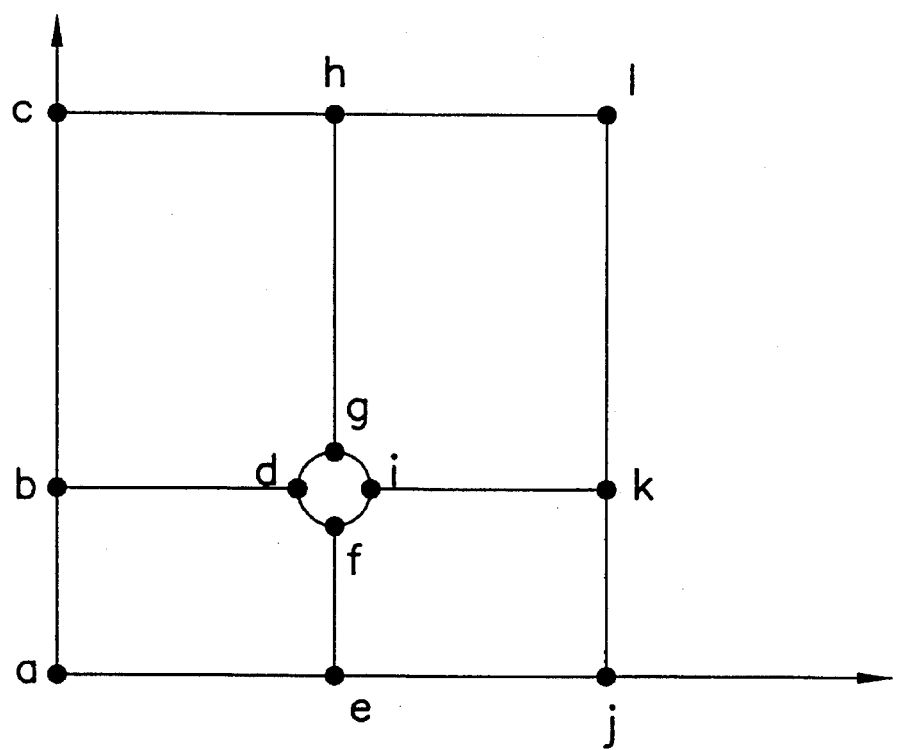

Fourth, in FIG. 3h, the design engine attempts to place the line AE having endpoints a and e. The x coordinate of e is determined by scaling the old value by the x direction scaling ratio, which places the line AE, since the y coordinate of e was set previously when placing line AJ. This enables the x coordinates of d, f, g, i and h to be fixed, since f, g and h are defined having the same x coordinate as e, and since d and i are a known offset from the x coordinate of e (given the known dimensions of the jewel). At this point, all x and y coordinates are known, which places the remaining elements into the resized design, including the jewel, the line EJ, and the lines CH and HL (since the y coordinate of h was fixed while placing line AC).

Data Structures

The following Table 6 illustrates the main data structures used by the design engine:

TABLE 6

```
class PPoint {
    Coord origX, origY, x, y;
    Boolean xFixed, yFixed;
    ListOfPObjects parents;
};
class PObject {
    Boolean busy;              // object is busy (don't send
  newConstraint)
    Boolean invisible;         // is this object visible?
    Boolean fixedSize;         // is the size of the object
  fixed?
    Boolean debugging;         // is true if we want debugging
```

TABLE 6-continued

```
information for this object
    PObjectType type;           // type of object - used as a
discriminant for the
    Priority priority;          // object's placement priority
(note above)
    ListOfPPoints points;  // list of points touching this
object
    Boolean placedone;          // has this object been
placed yet? This flag is private
};
class PGrid: public PObject {
    ListOfPObjects parts;       // components of this grid
element
    Boolean horizontalReTile;   // can change from original
horizontal tiles
    Boolean verticalReTile;     // can change from
original # of vertical tiles
};
class PCame: public PObject {
    CameType came;
};
class PArc: public PCame {
    PPoint *p1;                 // start point of the arc
    PPoint *p2;                 // end point of the arc
    PPoint *center;             // arc center
    Boolean centerInternal;     // we created center for our
private use
    Coord radius;               // arc radius
    Coord origRadius;           // original arc radius
    Boolean radiusFixed;        // has radius value been set yet?
    // we keep the arc angles internal mainly to speed the
bounding box code
    Angle origStartAngle; // starting angle of the original
arc (radians)
    Angle
origEndAngle;               // ending angle of the original arc
(radians)
};
class PCircle: public PCame {
    PPoint *center;             // circle center
    Boolean centerinternal;     // we created center for our
private use
    Coord radius;               // circle radius
    Coord origRadius;           // original circle radius
    Boolean radiusFixed;        // has radius value been set yet?
};
class PLine: public PCame {
    PPoint *p1;                 // start point of the line
    PPoint *p2;                 // end point of the line
    Angle angle;                // angle of line from p1 -> p2 in
radians
    Coord slope;                // slope if not horizontal/vertical
    // note: length is original length until fixedsize is set
    Coord length;               // length of the line
    Boolean horizontal;         // line is horizontal
    Boolean vertical;           // line is vertical
};
class PPropLine: public PLine {
    short lineGroup;            // group of lines we are
proportional wit
};
class PSpline: public PCame {
};
    class PPane {
        ListOfPObjects came;    // cames forming the boundary
of this pane
        GlassType glass;        // type of glass in this pane by
group
        char *otherText;        // other arbitrary text to be
passed through
    };
```

It will be appreciated that the above described logic flow and data structures may take on any number of configurations and operational characteristics, as are well known in the industry. Further, it is to be understood that even though numerous characteristics and advantages of the present invention have been set forth in the foregoing description, together with details of the structure and function of the invention, the disclosure is illustrative only and changes may be made in detail, especially in matters of the location of the various data files and the data structures. Further, other modifications and alterations are well within the knowledge of those skilled in the art and are to be included within the broad scope of the appended claims.

What is claimed is:

1. A method of automatically resizing a design, the design being of the type created by a CAD system, comprising the steps of:

(a) entering a design, the design including a plurality of draw primitives having predetermined relationships to one another, each draw primitive having at least one point locating the draw primitive, wherein each point has coordinates and at least one parent draw primitive;

(b) entering a set of rules related to resizing the design, wherein the rules form a hierarchical structure; whereby placement of certain draw primitives in the design occurs first and allows placement of other draw primitives within the hierarchical structure; and (c) resizing the design automatically in accordance with the rules, wherein the design is reconfigured to a different two-dimensional size without operator intervention, wherein the resizing step includes the step of placing the draw primitives based upon the hierarchical structure formed by the rules, the placing step including the steps of:

(1) placing a coordinate of a point on a first draw primitive; and (2) notifying each other parent draw primitive of the point on the first draw primitive of the placement of the coordinate; whereby common points on different draw primitives are collectively updated.

2. The method of claim 1, wherein the resizing step includes the step of prioritizing the draw primitives relative to one another to establish a placement order.

3. The method of claim 2, wherein the resizing step includes the steps of ranking the draw primitives by bounding box to establish a placement order and establishing the draw primitives making up the perimeter of the design as the highest priority draw primitives.

4. The method of claim 2, further comprising the step of establishing draw primitives which cannot be resized as higher priority draw primitives than the draw primitives which can be resized.

5. The method of claim 1, further comprising the step of reviewing the one or more database files for a corresponding spring point file which supports the resized design.

6. The method of claim 1, further comprising the step of translating the design into a database file structure.

7. The method of claim 1, further comprising the step of communicating the resized design to a remote computer.

8. The method of claim 1, wherein the design is an art glass design and wherein the design is in a DXF file format.

9. The method of claim 1, wherein the step of placing the draw primitives includes the step of marking the first draw primitive as busy until the notification of each other parent of the point on the first draw primitive returns.

10. A method of resizing an art glass design for frames of differing sizes from a predetermined art glass design, the design of the type which may include arcs, circles, lines, and complex objects each having known geometrical relationships to one another, the method comprising the steps of:

a) selecting a desired art glass design;

b) selecting a desired frame size; and c) determining the placement of the complex objects, arcs, circles and lines within said selected frame size automatically in accordance with a rule based software program operating in a hierarchical fashion, whereby placement of the arcs, circles, lines, and complex objects occurs in accordance with predetermined rules to maintain manufacturability and aesthetics.

11. The method of claim 10, further comprising the step of adding or subtracting additional arcs, circles, lines, and complex objects to the resized design in accordance with predetermined criteria, whereby a predetermined aesthetic balance is maintained in the resized design.

12. The method of claim 11, further comprising the steps of determining allowable ranges of sizes for the resized design and determining which allowable ranges of sizes requires inclusion of additional arcs, circles, lines, and complex objects in order to maintain a predetermined aesthetic balance.

13. The method of claim 12, further comprising the step of reviewing the resized design against predetermined criteria to insure manufacturability.

14. The method of claim 10, further comprising the steps of translating the design into a database file structure and communicating the resized design to a remote computer.

15. The method of claim 10, wherein each complex object, arc, circle and line is a draw primitive including at least one point locating the draw primitive, wherein each point has coordinates and at least one parent draw primitive, and wherein the step of determining the placement of the complex objects, arcs, circles and lines includes the steps of:

(a) placing a coordinate of a point on a first draw primitive; and (b) notifying each other parent draw primitive of the point on the first draw primitive of the placement of the coordinate; whereby common points on different draw primitives are collectively updated.

16. An apparatus for automatically generating resized art glass designs from an original art glass design, the apparatus comprising:

(a) memory means for storing an art glass design in a computer memory location, the design including one or more draw primitives and wherein associated with the draw primitives is data representative of the spatial relationship between the draw primitives in the design;

(b) first processor means for applying a set of predetermined rules to the draw primitives in said memory means, wherein the draw primitives are ranked relative to one another; and (c) second processor means for visiting the ranked draw primitives and for resizing the ranked draw primitives to create a resized design, wherein operator intervention is not required.

17. The apparatus of claim 16, wherein the rules form a hierarchical structure such that by finding the next draw primitive to be placed then subsequent draw primitives to be placed are found.

18. The apparatus of claim 17, wherein the first processor means includes bounding box determining means to rank the one or more draw primitives relative to one another.

19. The apparatus of claim 17, wherein the first processor means includes means for determining allowable ranges of sizes for the resized design.

20. The apparatus of claim 19, wherein said determining means reviews a plurality of files, the files including information on additional arcs, circles, lines, and complex objects which must be added to the resized design in order to maintain a predetermined aesthetic balance.

21. The apparatus of claim 16, further comprising communication means for receiving and transmitting designs.

22. The apparatus of claim 16, wherein each draw primitive includes at least one point locating the draw primitive, wherein each point has coordinates and at least one parent draw primitive, and wherein the second processor means includes:

(a) means for placing a coordinate of a point on a first draw primitive; and (b) means for notifying each other parent draw primitive of the point on the first draw primitive of the placement of the coordinate; whereby common points on different draw primitives are collectively updated.

* * * * *